United States Patent
Sprouse et al.

(10) Patent No.: US 9,870,149 B2
(45) Date of Patent: Jan. 16, 2018

(54) SCHEDULING OPERATIONS IN NON-VOLATILE MEMORY DEVICES USING PREFERENCE VALUES

(71) Applicant: SanDisk Technologies LLC, Plano, TX (US)

(72) Inventors: Steven Sprouse, San Jose, CA (US); Ryan Marlin, San Jose, CA (US)

(73) Assignee: SANDISK TECHNOLOGIES LLC, Plano, TX (US)

( * ) Notice: Subject to any disclaimer, the term of this patent is extended or adjusted under 35 U.S.C. 154(b) by 0 days.

(21) Appl. No.: 14/937,793

(22) Filed: Nov. 10, 2015

(65) Prior Publication Data

US 2017/0010815 A1 Jan. 12, 2017

Related U.S. Application Data

(60) Provisional application No. 62/190,183, filed on Jul. 8, 2015.

(51) Int. Cl.
*G06F 12/00* (2006.01)
*G06F 13/00* (2006.01)
(Continued)

(52) U.S. Cl.
CPC .......... *G06F 3/0604* (2013.01); *G06F 3/0631* (2013.01); *G06F 3/0688* (2013.01); *G06F 12/0253* (2013.01); *G06F 2212/7205* (2013.01)

(58) Field of Classification Search
CPC .... G06F 3/0604; G06F 3/0631; G06F 3/0688; G06F 12/0253; G06F 2212/7205
(Continued)

(56) References Cited

U.S. PATENT DOCUMENTS 4,586,167 A 4/1986 Fujishima et al.
5,559,988 A 9/1996 Durante et al.
(Continued)

FOREIGN PATENT DOCUMENTS

EP 0 376 285 A2 7/1990
WO WO 2012/083308 6/2012

OTHER PUBLICATIONS

Seagate Technology, "SCSI Commands Reference Manual, Rev. C", Product Manual dated Apr. 2010, pp. 211-214.
(Continued)

*Primary Examiner* — Sheng-Jen Tsai
(74) *Attorney, Agent, or Firm* — Brinks Gilson & Lione

(57) ABSTRACT

A method of scheduling memory operations to be performed by non-volatile memory devices in a storage system includes identifying a plurality of memory operations to be performed by a plurality of non-volatile memory devices in the storage system. The number of memory operations in the plurality of memory operations is no greater than the number of non-volatile memory devices in the plurality of non-volatile memory devices; each memory operation is to be performed by a distinct non-volatile memory device; and the memory operations include host writes, garbage collection writes, and garbage collection reads. The method also includes, for each non-volatile memory device, assigning preference values to each of the memory operations. The method further includes assigning each memory operation to a distinct non-volatile memory device, using the preference values assigned to each of the memory operations for each non-volatile memory device.

20 Claims, 15 Drawing Sheets

(51) Int. Cl.
*G06F 13/28* (2006.01)
*G06F 3/06* (2006.01)
*G06F 12/02* (2006.01)

(58) Field of Classification Search
USPC ........................................................ 711/103
See application file for complete search history.

(56) References Cited

U.S. PATENT DOCUMENTS

| | | | |
|---|---|---|---|
| 5,909,559 A | 6/1999 | So | |
| 6,247,136 B1 | 6/2001 | MacWilliams et al. | |
| 6,292,410 B1 | 9/2001 | Yi et al. | |
| 6,401,213 B1 | 6/2002 | Jeddeloh | |
| 6,449,709 B1 | 9/2002 | Gates | |
| 6,952,682 B1* | 10/2005 | Wellman | G06Q 30/08 705/1.1 |
| 7,969,809 B2* | 6/2011 | Ben-Rubi | G11C 5/14 365/226 |
| 8,010,738 B1 | 8/2011 | Chilton et al. | |
| 8,122,202 B2 | 2/2012 | Gillingham | |
| 8,213,255 B2 | 7/2012 | Hemink et al. | |
| 8,255,618 B1* | 8/2012 | Borchers | G06F 13/1642 710/21 |
| 8,321,627 B1* | 11/2012 | Norrie | G06F 13/161 365/185.33 |
| 8,429,498 B1 | 4/2013 | Anholt et al. | |
| 8,479,080 B1 | 7/2013 | Shalvi et al. | |
| 8,539,139 B1 | 9/2013 | Morris | |
| 8,595,590 B1 | 11/2013 | Vojcic et al. | |
| 8,775,720 B1* | 7/2014 | Meyer | G06F 3/0659 711/103 |
| 8,825,967 B2 | 9/2014 | Hong Beom | |
| 8,874,836 B1* | 10/2014 | Hayes | G06F 3/0659 711/103 |
| 8,886,872 B1* | 11/2014 | Norrie | G06F 17/30327 710/38 |
| 8,924,661 B1* | 12/2014 | Shachar | G06F 13/1668 365/189.2 |
| 8,984,376 B1 | 3/2015 | Norrie | |
| 9,128,825 B1 | 9/2015 | Albrecht et al. | |
| 9,170,876 B1 | 10/2015 | Bates et al. | |
| 9,176,971 B2 | 11/2015 | Shapiro | |
| 9,214,965 B2 | 12/2015 | Fitzpatrick et al. | |
| 2003/0115403 A1 | 6/2003 | Bouchard et al. | |
| 2003/0122834 A1 | 7/2003 | Mastronarde et al. | |
| 2004/0117441 A1 | 6/2004 | Liu et al. | |
| 2005/0144361 A1 | 6/2005 | Gonzalez et al. | |
| 2005/0248992 A1 | 11/2005 | Hwang et al. | |
| 2007/0002629 A1 | 1/2007 | Lee et al. | |
| 2007/0156998 A1* | 7/2007 | Gorobets | G06F 12/0246 711/170 |
| 2007/0233937 A1 | 10/2007 | Coulson et al. | |
| 2008/0140914 A1 | 6/2008 | Jeon | |
| 2008/0147994 A1* | 6/2008 | Jeong | G06F 12/0246 711/154 |
| 2008/0235466 A1* | 9/2008 | Traister | G11C 16/10 711/154 |
| 2008/0235480 A1* | 9/2008 | Traister | G06F 9/30032 711/167 |
| 2008/0291204 A1* | 11/2008 | Korupolu | G06T 11/206 345/440 |
| 2008/0295094 A1* | 11/2008 | Korupolu | G06F 9/5066 718/1 |
| 2009/0168525 A1 | 7/2009 | Olbrich et al. | |
| 2009/0177943 A1 | 7/2009 | Silvus et al. | |
| 2009/0222627 A1 | 9/2009 | Reid | |
| 2009/0282191 A1 | 11/2009 | Depta | |
| 2010/0005217 A1 | 1/2010 | Jeddeloh | |
| 2010/0014364 A1 | 1/2010 | Laberge et al. | |
| 2010/0082879 A1 | 4/2010 | McKean et al. | |
| 2010/0165730 A1 | 7/2010 | Sommer et al. | |
| 2010/0174845 A1 | 7/2010 | Gorobets et al. | |
| 2010/0174853 A1 | 7/2010 | Lee et al. | |
| 2010/0220509 A1 | 9/2010 | Solokov et al. | |
| 2010/0250874 A1 | 9/2010 | Farrell et al. | |
| 2011/0113204 A1 | 5/2011 | Henriksson et al. | |
| 2011/0138100 A1* | 6/2011 | Sinclair | G06F 13/1647 711/5 |
| 2011/0235434 A1 | 9/2011 | Byom et al. | |
| 2011/0252215 A1 | 10/2011 | Franceschini et al. | |
| 2011/0264851 A1 | 10/2011 | Jeon et al. | |
| 2011/0302474 A1 | 12/2011 | Goss et al. | |
| 2012/0030408 A1 | 2/2012 | Flynn et al. | |
| 2012/0047317 A1 | 2/2012 | Yoon et al. | |
| 2012/0159070 A1 | 6/2012 | Baderdinni et al. | |
| 2012/0198129 A1 | 8/2012 | Van Aken et al. | |
| 2012/0224425 A1 | 9/2012 | Fai et al. | |
| 2012/0278530 A1* | 11/2012 | Ebsen | G06F 3/0659 711/103 |
| 2012/0324180 A1 | 12/2012 | Asnaashari et al. | |
| 2013/0007380 A1 | 1/2013 | Seekins et al. | |
| 2013/0070507 A1 | 3/2013 | Yoon | |
| 2013/0111112 A1 | 5/2013 | Jeong et al. | |
| 2013/0111289 A1 | 5/2013 | Zhang et al. | |
| 2013/0111290 A1 | 5/2013 | Zhang et al. | |
| 2013/0132650 A1 | 5/2013 | Choi et al. | |
| 2013/0182506 A1 | 7/2013 | Melik-Martirosian | |
| 2013/0219106 A1 | 8/2013 | Vogan et al. | |
| 2013/0232290 A1* | 9/2013 | Ish | G06F 12/0246 711/103 |
| 2013/0254498 A1 | 9/2013 | Adachi et al. | |
| 2013/0262745 A1 | 10/2013 | Lin et al. | |
| 2013/0297894 A1 | 11/2013 | Cohen et al. | |
| 2013/0346805 A1 | 12/2013 | Sprouse et al. | |
| 2014/0006688 A1 | 1/2014 | Yu et al. | |
| 2014/0013026 A1 | 1/2014 | Venkata et al. | |
| 2014/0047170 A1 | 2/2014 | Cohen et al. | |
| 2014/0075100 A1* | 3/2014 | Kaneko | G06F 11/008 711/103 |
| 2014/0143637 A1 | 5/2014 | Cohen et al. | |
| 2014/0148175 A1* | 5/2014 | Luo | H04W 28/08 455/445 |
| 2014/0173239 A1 | 6/2014 | Schushan | |
| 2014/0229655 A1 | 8/2014 | Goss et al. | |
| 2014/0229656 A1 | 8/2014 | Goss et al. | |
| 2014/0241071 A1 | 8/2014 | Goss et al. | |
| 2014/0244897 A1 | 8/2014 | Goss et al. | |
| 2014/0244899 A1 | 8/2014 | Schmier et al. | |
| 2014/0258598 A1 | 9/2014 | Canepa et al. | |
| 2014/0281833 A1 | 9/2014 | Kroeger et al. | |
| 2014/0310241 A1 | 10/2014 | Goyen | |
| 2014/0379988 A1 | 12/2014 | Lyakhovitskiy et al. | |
| 2015/0067172 A1* | 3/2015 | Ashokan | H04L 47/743 709/226 |
| 2015/0074487 A1 | 3/2015 | Patapoutian et al. | |
| 2015/0095558 A1 | 4/2015 | Kim et al. | |
| 2015/0113206 A1* | 4/2015 | Fitzpatrick | G06F 12/0246 711/103 |
| 2015/0186278 A1 | 7/2015 | Jayakumar et al. | |
| 2015/0234612 A1* | 8/2015 | Himelstein | G06F 3/0619 714/6.21 |
| 2015/0261473 A1 | 9/2015 | Matsuyama et al. | |
| 2015/0262632 A1 | 9/2015 | Shelton et al. | |
| 2015/0301749 A1 | 10/2015 | Seo et al. | |
| 2015/0331627 A1 | 11/2015 | Kwak | |
| 2016/0026386 A1 | 1/2016 | Ellis et al. | |
| 2016/0034194 A1 | 2/2016 | Brokhman et al. | |
| 2016/0062699 A1 | 3/2016 | Samuels et al. | |
| 2016/0070493 A1 | 3/2016 | Oh et al. | |
| 2016/0071612 A1 | 3/2016 | Takizawa et al. | |
| 2016/0117099 A1 | 4/2016 | Prins et al. | |
| 2016/0117102 A1* | 4/2016 | Hong | G06F 3/061 711/103 |
| 2016/0117105 A1 | 4/2016 | Thangaraj et al. | |
| 2016/0117252 A1 | 4/2016 | Thangaraj et al. | |
| 2016/0170671 A1 | 6/2016 | Huang | |
| 2016/0170831 A1 | 6/2016 | Lesatre et al. | |
| 2016/0179403 A1 | 6/2016 | Kurotsuchi et al. | |
| 2016/0210060 A1* | 7/2016 | Dreyer | G06F 3/0613 |
| 2016/0299689 A1* | 10/2016 | Kim | G06F 3/061 |
| 2016/0299699 A1 | 10/2016 | Vanaraj et al. | |

(56) References Cited

U.S. PATENT DOCUMENTS

2016/0299704 A1 10/2016 Vanaraj et al.
2016/0299724 A1 10/2016 Vanaraj et al.
2016/0342344 A1 11/2016 Kankani et al.
2016/0342345 A1 11/2016 Kankani et al.
2016/0371394 A1* 12/2016 Shahidi ............. G06F 17/30958

OTHER PUBLICATIONS

Tanenbaum, "Structured Computer Organization", 3rd edition 1990, section 1.4, p. 11, 3 pages.
International Search Report and Written Opinion dated Nov. 18, 2015, received in International Patent Application No. PCT/US2015/039552 which corresponds to U.S. Appl. No. 14/559,183, 11 pages. (Ellis).
International Search Report and Written Opinion dated Jul. 4, 2016, received in International Patent Application No. PCT/US2016/028477, which corresponds to U.S. Appl. No. 14/883,540, 11 pages (Hodgdon).
International Search Report and Written Opinion dated Nov. 9, 2015, received in International Patent Application No. PCT/US2015/053551, which corresponds to U.S. Appl. No. 14/668,690, 12 pages (Thangaraj).
International Search Report and Written Opinion dated Nov. 11, 2015, received in International Patent Application No. PCT/US2015/053582, which corresponds to U.S. Appl. No. 14/659,493, 12 pages (Prins).
International Search Report and Written Opinion dated Sep. 8, 2016, received in International Patent Application No. PCT/US2016/036716, which corresponds to U.S. Appl. No. 14/925,945, 13 pages. (Ellis).
Atmel Data-sheet, "9-to-bit Selectable, ±0.5° C. Accurate Digital Temperature Sensor with Nonvolatile Registers and Serial EEPROM" www.atmel.com/images/Atmel-8854-DTS-AT30TSE752A-754A-758A-Datasheet.pdf, Atmel Data-sheet, Mar. 1, 2011,—Atmel-8854-DTS-AT30TSE752A-754A-758A-Datasheet_102014, 57 pages.

* cited by examiner

|  | NVM 140-1 | NVM 140-2 | NVM 140-3 | NVM 140-4 | ... | NVM 140-r |
|---|---|---|---|---|---|---|
| Host Write Process 302-1 | ✓ | ✓ | ✓ |  |  | ✓ |
| Host Write Process 302-2 | ✓ |  | ✓ |  |  |  |
| Host Write Process 302-3 |  | ✓ |  | ✓ |  |  |
| GC Write Process 304-1 | ✓ |  | ✓ | ✓ |  | ✓ |
| GC Write Process 304-2 | ✓ | ✓ |  |  |  | ✓ |
| GC Write Process 304-3 | ✓ |  |  |  |  |  |
| GC Read Process 306-1 | ✓ | ✓ |  |  |  | ✓ |
| GC Read Process 306-2 | ✓ | ✓ | ✓ | ✓ |  |  |
| GC Read Process 306-3 | ✓ |  |  |  |  |  |

Figure 3

| Operations 500 | | Dies 502 | |
|---|---|---|---|
| Host Wr | Op 500-0 | Die 502-0 | GC Rd, Host Wr, GC Wr [(0,3),(1,3),(2,3),(3,5), (4,5),(5,1),(6,1),(7,1)] |
| Host Wr | Op 500-1 | Die 502-1 | GC Wr, GC Rd, Host Wr [(0,5),(1,5),(2,5),(3,1), (4,1),(5,3),(6,3),(7,3)] |
| Host Wr | Op 500-2 | Die 502-2 | GC Rd, Host Wr, GC Wr [(0,3),(1,3),(2,3),(3,5), (4,5),(5,1),(6,1),(7,1)] |
| GC Wr | Op 500-3 | Die 502-3 | Host Wr, GC Rd, GC Wr [(0,1),(1,1),(2,1),(3,5), (4,5),(5,3),(6,3),(7,3)] |
| GC Wr | Op 500-4 | Die 502-4 | Host Wr, GC Wr, GC Rd [(0,1),(1,1),(2,1),(3,3), (4,3),(5,5),(6,5),(7,5)] |
| GC Rd | Op 500-5 | Die 502-5 | Host Wr, GC Rd, GC Wr [(0,1),(1,1),(2,1),(3,5), (4,5),(5,3),(6,3),(7,3)] |
| GC Rd | Op 500-6 | Die 502-6 | GC Wr, Host Wr, GC Rd [(0,3),(1,3),(2,3),(3,1), (4,1),(5,5),(6,5),(7,5)] |
| GC Rd | Op 500-7 | Die 502-7 | GC Wr, GC Rd, Host Wr [(0,5),(1,5),(2,5),(3,1), (4,1),(5,3),(6,3),(7,3)] |

In a storage system having a storage controller and non-volatile memory devices:

(E)

The storage controller comprises a front-end controller and a plurality of back-end controllers coupled to the front-end controller;
each back-end controller is coupled to a respective subset of the plurality of non-volatile memory devices;
the front-end controller receives host-write requests and schedules garbage collection writes in accordance with the host write requests;
the back-end controllers schedule garbage collection reads, wherein each garbage collection read corresponds to a respective garbage collection write; and
the front-end controller performs the identifying, the assigning of preference values, and the assigning of each memory operation

— 602

— 640

---

Assign each memory operation to a distinct non-volatile memory device, using the preference values assigned to each of the memory operations for each non-volatile memory device — 624

(B)

Assign preference values to each of the memory operations comprises, for each non-volatile memory device, rank the memory operations in order of preference; and
assign each memory operation to a distinct non-volatile memory device comprises solve the Stable Marriage Problem in accordance with the ranking of the memory operations in order of preference for each non-volatile memory device

— 642

(F)

Partition the memory operations into a group of host writes, a group of garbage collection writes, and a group of garbage collection reads — 644

Rank the memory operations in order of preference comprises rank the groups and ordering the memory operations by the ranked groups — 646

Figure 6D

SCHEDULING OPERATIONS IN NON-VOLATILE MEMORY DEVICES USING PREFERENCE VALUES

RELATED APPLICATIONS

This application claims priority to U.S. Provisional Patent Application No. 62/190,183, filed Jul. 8, 2015, which is incorporated by reference in its entirety.

TECHNICAL FIELD

The disclosed embodiments relate generally to scheduling operations in non-volatile memory devices (e.g., NAND flash memory devices), and in particular to assigning operations to respective non-volatile memory devices based at least in part on preference values of the non-volatile memory devices for the operations.

BACKGROUND

In high performance flash memory architectures, performance is maximized by operating system resources as efficiently as possible. Conventional systems attempt to improve efficiency by allowing multiple operations to be worked on independently through the use of queues, pipelines, and parallel operations. However, when resources in such systems are poorly scheduled, these systems may exhibit a "slinky effect," such that a system bottleneck moves from one resource to another over time. For example, in a NAND system, a NAND bus interface may be a short-term bottleneck when data are transferred to sets of idle NAND dies. Once the dies begin programming, the NAND bus is idle. Therefore, the idle time on NAND and NAND buses due to poor scheduling leads to poor system performance.

SUMMARY

Without limiting the scope of the appended claims, after considering this disclosure, and particularly after considering the section entitled "Detailed Description" one will understand how the aspects of various embodiments are implemented and used to manage operations performed within non-volatile storage devices, in order to improve the performance of non-volatile storage devices. In some embodiments, in a storage controller of a storage system, a plurality of memory operations to be performed by a plurality of non-volatile memory devices coupled to the storage controller are identified. The number of memory operations in the plurality of memory operations typically is no greater than the number of non-volatile memory devices in the plurality of non-volatile memory devices, each memory operation is to be performed by a distinct non-volatile memory device, and the memory operations include host writes, garbage collection writes, and garbage collection reads. For each non-volatile memory device, preference values are assigned to each of the memory operations. Each memory operation is then assigned to a distinct non-volatile memory device, using the preference values assigned to each of the memory operations for each non-volatile memory device.

BRIEF DESCRIPTION OF THE DRAWINGS

So that the present disclosure can be understood in greater detail, a more particular description may be had by reference to the features of various embodiments, some of which are illustrated in the appended drawings. The appended drawings, however, merely illustrate pertinent features of the present disclosure and are therefore not to be considered limiting, for the description may admit to other effective features.

FIG. 3 illustrates a plurality of memory access processes with operations directed to respective pages in a plurality of non-volatile memory devices, in accordance with some embodiments.

FIGS. 5A-5B illustrate the assignment of operations to NVM dies through solution of the Assignment Problem in accordance with some embodiments.

FIGS. 6A-6F illustrate flowchart representations of methods of managing a storage system in accordance with some embodiments.

Figure 1A:
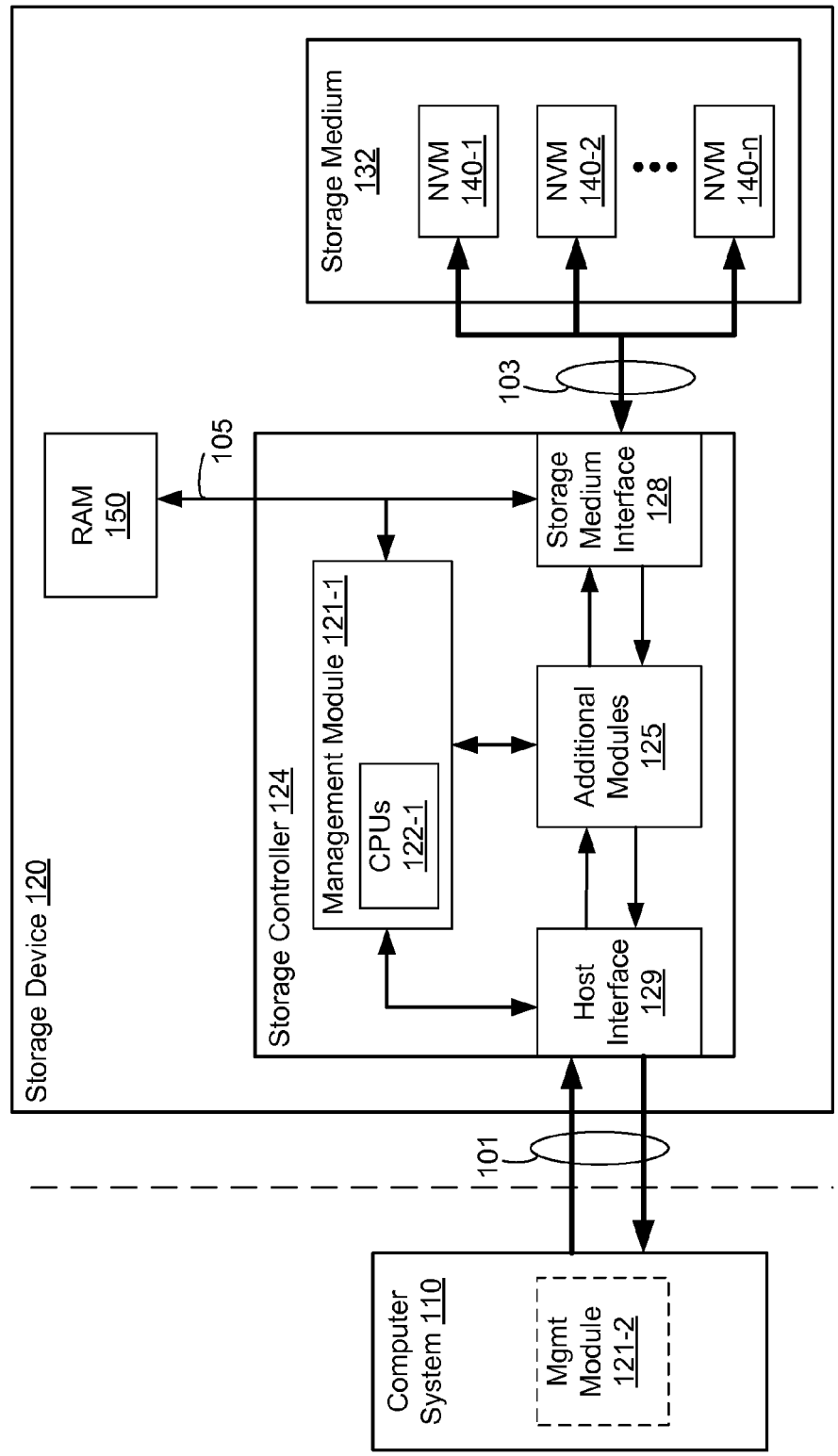
FIGS. 1A and 1B are block diagrams illustrating data storage systems in accordance with some embodiments.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

Poorly scheduled resources in a storage system negatively impact the storage system performance. Consequently, what is desired are scheduling mechanisms that efficiently use system resources to perform heterogeneous operations (e.g., host writes, garbage collection writes, and/or garbage collection reads). Efficient use of system resources reduces the "slinky effect," and thereby reduces system bottlenecks. In embodiments described herein, the storage system maps a memory operation scheduling problem (sometimes called a scheduling task, for scheduling a set of memory operations) is mapped into an optimization problem such as the Stable Marriage Problem or the Assignment Problem and solved accordingly, to improve the system performance.

In the Stable Marriage Problem, first and second groups each have n members, where n is an integer greater than one. Each member of each group ranks every member of the other group in order of preference, from 1 to n. Each member of each group is assigned (e.g., married to) a member of the other group, such that there are no two members of different groups who would rather be assigned (e.g., married) to each other than with their assigned partners. In the context of storage systems, the first group is memory operations and the second group is memory devices (e.g., memory die). The Stable Marriage Problem can be solved, for example, using the Gale-Shapley iterative algorithm.

In the Assignment Problem, a group of agents and a group of tasks each have n members. Any agent may be assigned to perform any task, at a cost that varies as a function of the agent-task assignment. Each task is assigned a single agent and each agent is assigned a single task such that the total cost is minimized. The Assignment Problem can be solved, for example, using the Hungarian Algorithm.

Solution of the Stable Marriage Problem or the Assignment Problem in the context of storage-system scheduling thus allows memory operations to be assigned efficiently to respective memory devices.

(A1) More specifically, some embodiments include a method of managing a storage system. The method is performed in a storage system having a storage controller a non-volatile memory devices, and includes identifying a plurality of memory operations to be performed by a plurality of non-volatile memory devices in the storage system. The number of memory operations in the plurality of memory operations is no greater than the number of non-volatile memory devices in the plurality of non-volatile memory devices; each memory operation is to be performed by a distinct non-volatile memory device; and the memory operations include host writes, garbage collection writes, and garbage collection reads. The method also includes, for each non-volatile memory device, assigning preference values to each of the memory operations. The method further includes assigning each memory operation to a distinct non-volatile memory device, using the preference values assigned to each of the memory operations for each non-volatile memory device.

(A2) In some embodiments of the method of A1, the plurality of non-volatile memory devices includes a plurality of memory dies. Each non-volatile memory device includes a distinct memory die of the plurality of memory dies.

(A3) In some embodiments of the method of A1 or A2, the storage controller manages a plurality of processes. Each memory operation is part of a process. A respective process includes memory operations of a common type selected from the group consisting of host writes, garbage collection writes, and garbage collection reads. The memory operations of a respective process include memory operations directed to respective pages in each of the non-volatile memory devices.

(A4) In some embodiments of the method of A3, the plurality of non-volatile memory devices includes a first memory device and remaining memory devices. The respective pages of the remaining memory devices store data. The respective page of the first memory device stores parity information corresponding to the data stored in the respective pages of the remaining memory devices.

(A5) In some embodiments of the method of A3 or A4, assigning preference values includes, for a respective non-volatile memory device: determining that a first memory operation of the plurality of memory operations is associated with a process for which no more than a specified number of memory operations are incomplete, and in response to the determining, assigning preference values to the memory operations that indicate a preference of the respective non-volatile memory device for the first memory operation over other memory operations of the plurality of memory operations.

(A6) In some embodiments of the method of A5, the determining includes determining that the first memory operation is the only remaining incomplete memory operation for its process.

(A7) In some embodiments of the method of any one of A1 to A6, assigning preference values includes, for a respective non-volatile memory device: determining that all memory operations that the respective non-volatile memory device currently can perform are of a first type selected from the group consisting of host writes, garbage collection writes, and garbage collection reads; and, in response to the determining, assigning preference values to the memory operations that indicate a preference of the respective non-volatile memory device for the first type of memory operation over other types of memory operations.

(A8) In some embodiments of the method of any one of A1 to A7, the storage controller includes a front-end controller and a plurality of back-end controllers coupled to the front-end controller. Each back-end controller is coupled to a respective subset of the plurality of non-volatile memory devices. The front-end controller receives host write requests and schedules garbage collection writes in accordance with the host write requests. The back-end controllers schedule garbage collection reads, wherein each garbage collection read corresponds to a respective garbage collection write. The front-end controller performs the identifying, the assigning of preference values, and the assigning of each memory operation.

(A9) In some embodiments of the method of any one of A1 to A8, the method further includes, for each memory operation of the plurality of memory operations, assigning preference values to each of the non-volatile memory devices. Assigning each memory operation to a distinct non-volatile memory device is performed using both the preference values assigned to each of the non-volatile memory devices for each memory operation and the preference values assigned to each of the memory operations for each non-volatile memory device.

(A10) In some embodiments of the method of A9, the storage controller includes a front-end controller and a plurality of back-end controllers coupled to the front-end controller. Each back-end controller is coupled to a respective subset of the plurality of non-volatile memory devices. Assigning the preference values to each of the non-volatile memory devices includes, for a respective memory operation of the plurality of memory operations, assigning preference values that indicate a preference of the respective memory operation for a first subset of the plurality of non-volatile memory devices over other subsets of the plurality of non-volatile memory devices.

(A11) In some embodiments of the method of any one of A1 to A10, assigning preference values to each of the memory operations includes, for each non-volatile memory device, ranking the memory operations in order of preference. Assigning each memory operation to a distinct non-volatile memory device includes solving the Stable Marriage Problem in accordance with the ranking of the memory operations in order of preference for each non-volatile memory device.

(A12) In some embodiments of the method of A11, the method further includes partitioning the memory operations into a group of host writes, a group of garbage collection writes, and a group of garbage collection reads. Ranking the memory operations in order of preference includes ranking the groups and ordering the memory operations by the ranked groups.

(A13) In some embodiments of the method of A11 or A12, the method further includes, for each memory operation of the plurality of memory operations, ranking the non-volatile memory devices in order of preference. Solving the Stable Marriage Problem is performed in accordance with both the ranking of the non-volatile memory devices in order of preference for each memory operation and the ranking of the memory operations in order of preference for each non-volatile memory device.

(A14) In some embodiments of the method of any one of A1 to A10, assigning preference values to each of the memory operations includes, for each non-volatile memory device, assigning weights to the memory operations. Assigning each memory operation to a distinct non-volatile memory device includes solving the Assignment Problem in accordance with the weights of the memory operations for each non-volatile memory device.

(A15) In some embodiments of the method of A14, the method further includes partitioning the memory operations into a group of host writes, a group of garbage collection writes, and a group of garbage collection reads. Assigning weights to the memory operations includes, for each non-volatile memory device, assigning a first weight to each operation in the group of host writes, assigning a second weight to each operation in the group of garbage collection writes, and assigning a third weight to each operation in the group of garbage collection reads, wherein the first, second, and third weights are distinct.

(A16) In some embodiments of the method of A14 or A15, the method further includes, for each memory operation of the plurality of memory operations, ranking the non-volatile memory devices in order of preference. Solving the Assignment Problem is performed in accordance with both the ranking of the non-volatile memory devices in order of preference for each memory operation and the weights of the memory operations for each non-volatile memory device.

(A17) In some embodiments of the method of any one of A1 to A16, identifying the number of memory operations to be performed by the non-volatile memory devices includes determining a ratio of host writes to garbage collection writes, based on a write amplification of the storage system; selecting host writes and garbage collection writes such that the number of host writes and the number of garbage collection writes satisfy the ratio; and selecting garbage collection reads such that the number of garbage collection reads equals the number of garbage collection writes.

(A18) In another aspect, a storage system includes a plurality of non-volatile memory devices, one or more processors, and memory storing one or more programs configured for execution by the one or more processors. The one or more programs include instructions for performing the method of any one of A1 to A11 described above. Alternatively stated, the one or more programs include instructions that when executed by the one or more processors, cause the storage system to perform the method of any one of A1 to A11 described above.

(A19) In yet another aspect, a non-transitory computer-readable storage medium stores one or more programs configured for execution by one or more processors of a storage system that further includes a plurality of non-volatile memory devices. The one or more programs include instructions for performing the method of any one of A1 to A17 described above.

Numerous details are described herein in order to provide a thorough understanding of the example embodiments illustrated in the accompanying drawings. However, some embodiments may be practiced without many of the specific details, and the scope of the claims is only limited by those features and aspects specifically recited in the claims. Furthermore, well-known methods, components, and circuits have not been described in exhaustive detail so as not to unnecessarily obscure pertinent aspects of the embodiments described herein.

FIG. 1A is a block diagram illustrating a data storage system 100, in accordance with some embodiments. While some example features are illustrated, various other features have not been illustrated for the sake of brevity and so as not to obscure pertinent aspects of the example embodiments disclosed herein. To that end, as a non-limiting example, data storage system 100 includes a storage device 120 (also sometimes called an information storage device, or a data storage device, or a memory device), which includes a storage controller 124, storage medium 132, and random-access memory (RAM) 150. The storage device 120 is used in conjunction with or includes a computer system 110 (e.g., a host system or a host computer).

In some embodiments, storage medium 132 includes a plurality of non-volatile memory (NVM) devices 140-1 through 140-n. In some embodiments, storage medium 132 is NAND-type flash memory or NOR-type flash memory (e.g., NVM devices 140-1 through 140-n are NAND-type flash memory or NOR-type flash memory). In some embodiments, storage medium 132 includes one or more three-dimensional (3D) memory devices. Further, in some embodiments, storage controller 124 is a solid-state drive (SSD) controller. However, other types of storage media (e.g., other types of NVM devices) may be included in accordance with aspects of a wide variety of embodiments (e.g., PCRAM, ReRAM, STT-RAM, etc.). In some embodiments, a NVM device includes one or more flash memory dies, one or more flash memory packages, one or more flash memory channels or the like. For example, each NVM device 140 (or a respective NVM device) includes a plurality of memory dies, and each of the NVM devices 140-1 through 140-n is a distinct NVM die and/or distinct NVM package. In some embodiments, data storage system 100 can contain one or more storage devices 120.

Computer system 110 is coupled to storage controller 124 through data connections 101. However, in some embodiments computer system 110 includes storage controller 124, or a portion of storage controller 124, as a component and/or as a subsystem. For example, in some embodiments, some or all of the functionality of storage controller 124 is implemented by software executed on computer system 110. Computer system 110 may be any suitable computer device, such as a computer, a laptop computer, a tablet device, a netbook, an internet kiosk, a personal digital assistant, a mobile phone, a smart phone, a gaming device, a computer server, or any other computing device. Computer system 110 is sometimes called a host, host system, client, or client system. In some embodiments, computer system 110 is a server system, such as a server system in a data center. In some embodiments, computer system 110 includes one or more processors, one or more types of memory, a display and/or other user interface components such as a keyboard, a touch-screen display, a mouse, a track-pad, a digital camera, and/or any number of supplemental I/O devices to add functionality to computer system 110. In some embodiments, computer system 110 does not have a display and other user interface components.

Storage medium 132 is coupled to storage controller 124 through connections 103. Connections 103 are sometimes called data connections, but typically convey commands in addition to data, and optionally convey metadata, error correction information and/or other information in addition to data values to be stored in storage medium 132 and data values read from storage medium 132. In some embodiments, however, storage controller 124 and storage medium 132 are included in the same device (e.g., an integrated device) as components thereof. Furthermore, in some embodiments, storage controller 124 and storage medium 132 are embedded in a host device (e.g., computer system 110), such as a mobile device, tablet, other computer or computer controlled device, and the methods described herein are performed, at least in part, by the embedded storage controller. Storage medium 132 may include any number (e.g., one or more) of memory devices including, without limitation, non-volatile semiconductor memory devices, such as flash memory device(s). For example, flash memory device(s) can be configured for enterprise storage suitable for applications such as cloud computing, for database applications, primary and/or secondary storage, or for caching data stored (or to be stored) in secondary storage, such as hard disk drives. Additionally and/or alternatively, flash memory device(s) can also be configured for relatively smaller-scale applications such as personal flash drives or hard-disk replacements for personal, laptop, and tablet computers.

Storage medium 132 is divided into a number of addressable and individually selectable blocks, such as selectable portion 133. In some embodiments, the individually selectable blocks are the minimum size erasable units in a flash memory device. In other words, each block contains the minimum number of memory cells that can be erased without erasing any other memory cells in the same flash memory device. Typically, when a flash memory block is erased, all memory cells in the block are erased simultaneously. Each block is usually further divided into a plurality of pages and/or word lines, where each page or word line is typically an instance of the smallest individually accessible (readable) portion in a block. In some embodiments (e.g., using some types of flash memory), the smallest individually accessible unit of a data set, however, is a sector, which is a subunit of a page. That is, a block includes a plurality of pages, each page contains a plurality of sectors, and each sector is the minimum unit of data for reading data from the flash memory device. For example, in some implementations, each block includes a number of pages, such as 64 pages, 128 pages, 256 pages or another suitable number of pages. Blocks are typically grouped into a plurality of zones. Each block zone can be independently managed to some extent, which increases the degree of parallelism for parallel operations and simplifies management of storage medium 132.

Additionally, if data is written to a storage medium in pages, but the storage medium is erased in blocks, pages in the storage medium may contain invalid (e.g., stale) data, but those pages cannot be overwritten until the whole block containing those pages is erased. In order to write to the pages with invalid data, the pages (if any) with valid data in that block are read and re-written to a new block and the old block is erased (or put on a queue for erasing). This process is called garbage collection. After garbage collection, the new block contains the pages with valid data and may have free pages that are available for new data to be written, and the old block can be erased so as to be available for new data to be written.

A phenomenon related to garbage collection is write amplification. Write amplification is a phenomenon where the actual amount of physical data written to a storage medium (e.g., NVM devices 140 in storage device 120) is a multiple of the logical amount of data written by a host (e.g., computer system 110, sometimes called a host) to the storage medium. As discussed above, when a block of storage medium must be erased before it can be re-written, the garbage collection process to perform these operations results in re-writing data one or more times. This multiplying effect increases the number of writes required over the life of a storage medium, which shortens the time it can reliably operate. The formula to calculate the write amplification of a storage system is given by equation:

$$\frac{\text{amount of data written to a storage medium}}{\text{amount of data written by a host}}$$

Write operations that are performed in response to commands from the host are referred to as host writes, while write operations performed during garbage collection are referred to as garbage collection writes. For a given write amplification, the ratio of the number of garbage collection writes to the number of host writes equals the write amplification minus 1. Furthermore, a garbage collection read is performed for each garbage collection write: data to be written to a new block during garbage collection must be read from an old block. RAM 150 is used to store data read from NVM devices 140 during garbage collection reads until the data is re-written to the NVM devices 140 during garbage collection writes.

In some implementations, for example some embodiments of data storage system 100 shown in FIG. 1A, storage controller 124 receives host write commands from the computer system 110 and determines the number of garbage collection writes to be performed, based on the write amplification and the number of host write commands received. In other embodiments, the number of garbage collection writes to be performed may be determined based on other factors or additional factors, such as the current number of erased blocks that are ready to be written. The storage controller 124 schedules the host writes, the garbage collection writes, and a number of garbage collection reads equal to the number of garbage collection writes. Scheduling these operations includes assigning respective operations to respective NVM devices 140 (e.g., during a specified time period). Continuing with the description of FIG. 1A, in some embodiments, storage controller 124 includes a management module 121-1, a host interface 129, a storage medium (I/O) interface 128, and additional module(s) 125. Storage controller 124 may include various additional features that have not been illustrated for the sake of brevity and so as not to obscure pertinent features of the example embodiments disclosed herein, and a different arrangement of features may be possible.

Host interface 129 provides an interface to computer system 110 through data connections 101. Similarly, storage medium interface 128 provides an interface to storage medium 132 though connections 103. In some embodiments, storage medium interface 128 includes read and write circuitry, including circuitry capable of providing reading signals to storage medium 132 (e.g., reading threshold voltages for NAND-type flash memory, as discussed below). In some embodiments, connections 101 and connections 103 are implemented as a communication media over which commands and data are communicated, using a protocol such as DDR3, SCSI, SATA, SAS, or the like. In some embodiments, storage controller 124 includes one or more processing units (also sometimes called CPUs, processors, microprocessors, or microcontrollers) configured to execute instructions in one or more programs (e.g., in storage controller 124). In some embodiments, the one or more processors are shared by one or more components within, and in some cases, beyond the function of storage controller 124.

In some embodiments, management module 121-1 includes one or more central processing units (CPUs, also sometimes called processors, microprocessors, or microcontrollers) 122-1 configured to execute instructions in one or more programs (e.g., in management module 121-1). In some embodiments, the one or more CPUs 122-1 are shared by one or more components within, and in some cases, beyond the function of storage controller 124. Management module 121-1 is coupled to host interface 129, additional module(s) 125 and storage medium interface 128 in order to coordinate the operation of these components. In some embodiments, one or more modules of management module 121-1 are implemented in management module 121-2 of computer system 110. In some embodiments, one or more processors of computer system 110 (not shown) are configured to execute instructions in one or more programs (e.g., in management module 121-2). Management module 121-2 is coupled to storage device 120 in order to manage the operation of storage device 120.

Additional module(s) 125 are coupled to storage medium interface 128, host interface 129, and management module 121-1. As an example, additional module(s) 125 may include an error control module to limit the number of uncorrectable errors inadvertently introduced into data during writes to memory and/or reads from memory. In some embodiments, additional module(s) 125 are executed in software by the one or more CPUs 122-1 of management module 121-1, and, in other embodiments, additional module(s) 125 are implemented in whole or in part using special purpose circuitry (e.g., to perform encoding and decoding functions). In some embodiments, additional module(s) 125 are implemented in whole or in part by software executed on computer system 110.

As data storage densities of non-volatile semiconductor memory devices continue to increase, stored data is more prone to being stored and/or read erroneously. In some embodiments, error control coding can be utilized to limit the number of uncorrectable errors that are introduced by electrical fluctuations, defects in the storage medium, operating conditions, device history, write-read circuitry, etc., or a combination of these and various other factors.

In some embodiments, an error control module, included in additional module(s) 125, includes an encoder and a decoder. In some embodiments, the encoder encodes data by applying an error control code (ECC) to produce a codeword, which is subsequently stored in storage medium 132. When encoded data (e.g., one or more codewords) is read from storage medium 132, the decoder applies a decoding process to the encoded data to recover the data, and to correct errors in the recovered data within the error correcting capability of the error control code. Those skilled in the art will appreciate that various error control codes have different error detection and correction capacities, and that particular codes are selected for various applications for reasons beyond the scope of this disclosure. As such, an exhaustive review of the various types of error control codes is not provided herein. Moreover, those skilled in the art will appreciate that each type or family of error control codes may have encoding and decoding algorithms that are particular to the type or family of error control codes. On the other hand, some algorithms may be utilized at least to some extent in the decoding of a number of different types or families of error control codes. As such, for the sake of brevity, an exhaustive description of the various types of encoding and decoding algorithms generally available and known to those skilled in the art is not provided herein.

In some embodiments, during a host write operation, host interface 129 receives data to be stored in storage medium 132 from computer system 110. The data received by host interface 129 is made available to an encoder (e.g., in additional module(s) 125), which encodes the data to produce one or more codewords. The one or more codewords are made available to storage medium interface 128, which transfers the one or more codewords to storage medium 132 in a manner dependent on the type of storage medium being utilized.

In some embodiments, a host read operation is initiated when computer system (host) 110 sends one or more host read commands (e.g., via data connections 101, or alternatively a separate control line or bus) to storage controller 124 requesting data from storage medium 132. Storage controller 124 sends one or more read access commands to storage medium 132, via storage medium interface 128, to obtain raw read data in accordance with memory locations (or logical addresses, object identifiers or the like) specified by the one or more host read commands. Storage medium interface 128 provides the raw read data (e.g., comprising one or more codewords) to a decoder (e.g., in additional module(s) 125). If the decoding is successful, the decoded data is provided to host interface 129, where the decoded data is made available to computer system 110. In some embodiments, if the decoding is not successful, storage controller 124 may resort to a number of remedial actions or provide an indication of an irresolvable error condition. In some embodiments, host read operations are performed as corresponding commands are received from the host, and thus are not included in the scheduling techniques (e.g., based on the Stable Marriage problem or Assignment Problem) disclosed herein.

As explained above, a storage medium (e.g., NVM devices 140) is divided into a number of addressable and individually selectable blocks and each block is optionally (but typically) further divided into a plurality of pages and/or word lines and/or sectors.

While erasure of a storage medium is performed on a block basis, in many embodiments, reading and programming of the storage medium is performed on a smaller subunit of a block (e.g., on a page basis, word line basis, or sector basis). In some embodiments, the smaller subunit of a block consists of multiple memory cells (e.g., single-level cells or multi-level cells). In some embodiments, programming is performed on an entire page. In some embodiments, a multi-level cell (MLC) NAND flash typically has four possible states per cell, yielding two bits of information per cell. Further, in some embodiments, a MLC NAND has two page types: (1) a lower page (sometimes called fast page), and (2) an upper page (sometimes called slow page). In some embodiments, a triple-level cell (TLC) NAND flash has eight possible states per cell, yielding three bits of information per cell. Although the description herein uses TLC, MLC, and SLC as examples, those skilled in the art will appreciate that the embodiments described herein may be extended to memory cells that have more than eight possible states per cell, yielding more than three bits of information per cell. In some embodiments, the encoding format of the storage media (e.g., TLC, MLC, or SLC and/or a chosen data redundancy mechanism) is a choice made (or implemented) when data is actually written to the storage media.

Flash memory devices (in some embodiments, storage medium 132) utilize memory cells (e.g., SLC, MLC, and/or TLC) to store data as electrical values, such as electrical charges or voltages. Each flash memory cell typically includes a single transistor with a floating gate that is used to store a charge, which modifies the threshold voltage of the transistor (e.g., the voltage needed to turn the transistor on). The magnitude of the charge, and the corresponding threshold voltage the charge creates, is used to represent one or more data values. In some embodiments, during a read operation, a reading threshold voltage is applied to the control gate of the transistor and the resulting sensed current or voltage is mapped to a data value.

In some embodiments, RAM 150 is a double-data-rate (DDR) RAM. In some embodiments, RAM 150 is coupled to storage controller 124 (e.g., through a bus 105 that connects to management module 121-1 and/or storage medium interface 128). Alternatively, RAM 150 is part of storage controller 124, or is part of storage medium 132.

Figure 1B:
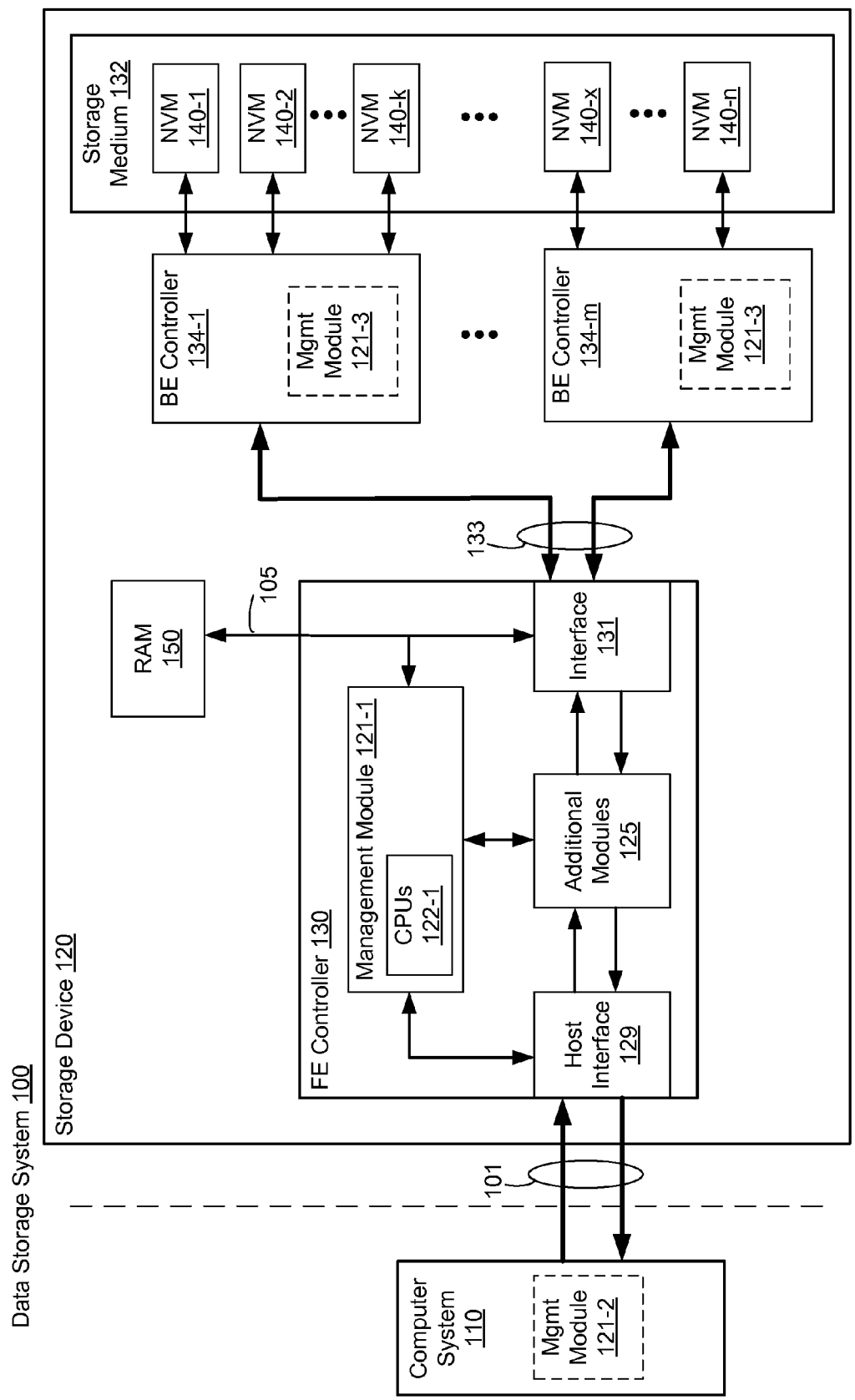

Attention is now directed to FIG. 1B, illustrating a block diagram of an implementation of a data storage system 100, in accordance with some embodiments. To avoid needless repetition of explanations already provided above, features and components of data storage system 100 already shown in FIG. 1A and described above, and shown again in FIG. 1B, are not described again here, and instead only additional features and components are described with respect to FIG. 1B. Additionally, some components illustrated in FIG. 1A are, in some embodiments, still a part of the implementation illustrated in FIG. 1B, although not explicitly illustrated. For example, in some embodiments both front-end (FE) controller 130 and back-end (BE) controllers 134 are components of storage controller 124 (FIG. 1A). As such, the features and components of storage controller 124, described above with respect to in FIG. 1A, are in some embodiments also applicable to FE controller 130 and BE controllers 134 and components (e.g., management module 121-1 and management modules 121-3) contained within FE controller 130 and BE controllers 134. In some embodiments in which data storage system 100 includes a plurality of storage devices 120, one or more of the storage devices are configured as illustrated in FIG. 1B, while other storage devices are configured as illustrated in FIG. 1A.

As a non-limiting example, data storage system 100 includes storage device 120, which includes a FE controller 130 and a plurality of BE controllers 134-1 through 134-m. Connections 133 couple FE controller 130 with the BE controllers 134-1 through 134-m, each of which is coupled with and controls a respective plurality of NVM devices, e.g., NVM devices 140-1 through 140-k. The FE controller 130 includes a management module 121-1. Similarly, each of the BE controllers 134-1 through 134-m includes a management module 121-3. Together, management modules 121-1 and 121-3 mange the operation of storage device 120.

In this non-limiting example, data storage system 100 is used in conjunction with computer system 110. In some implementations, storage device 120 includes a plurality of NVM devices. In some implementations, NVM devices 140 include NAND-type flash memory or NOR-type flash memory. Further, in some implementations, each FE controller 130 and BE controller 134 is or includes a solid-state drive (SSD) controller. However, one or more other types of storage media may be included in accordance with aspects of a wide variety of implementations.

In some embodiments, the plurality of BE controllers 134 are coupled with FE controller 130 through connections 133. Connections 133 are sometimes called data connections, but typically convey commands in addition to data, and optionally convey metadata, error correction information, and/or other information in addition to data values to be stored in NVM devices 140 and data values read from NVM devices 140. In some embodiments, each BE controller 130 is coupled to a respective subset of the plurality of non-volatile memory devices. For example, as shown in FIG. 1B, BE controller 134-1 is coupled to a subset of the non-volatile storage medium 132, namely NVM 140-1, NVM 140-2 . . . NVM 140-k, while BE controller 134-m is coupled to a different subset of the non-volatile storage medium 132, namely NVM 140-x . . . NVM 140-n.

In some embodiments, FE controller 130, the plurality of BE controllers 134, and NVM devices 140 are included in the same device (e.g., an integrated device such as storage medium 132 of FIG. 1A) as components thereof. Furthermore, in some embodiments, FE controller 130 and BE controllers 134 are embedded in a host device (e.g., computer system 110), such as a mobile device, tablet, other computer or computer controlled device, and the methods described herein are performed, at least in part, by the embedded storage controller.

In some embodiments, storage device 120 includes m memory channels, each of which has a BE controller 134 and a set of NVM devices 140 coupled to the BE controller 134, where m is an integer greater than one. In some embodiments, two or more memory channels share a BE controller 134. In either example, each memory channel has its own distinct set of NVM devices 140. In a non-limiting example, m typically is 8, 16 or 32. In another non-limiting example, the number of NVM devices 140 per memory channel is typically 8, 16, 32 or 64. Furthermore, in some embodiments, the number of NVM devices 140 is different in different memory channels.

In some embodiments, FE controller 130 and each BE controller 134 include a portion of RAM 150, for example implementing a write cache, while in other embodiments only FE controller 130 implements a write cache in RAM 150. In some embodiments, each BE controller 134 optionally includes a management module 121 (e.g., management modules 121-3 of BE controllers 134). The management modules 121-3 of BE controllers 164 also, in some embodiments, include one or more CPUs (not shown in FIG. 1B).

In some embodiments, management module 121-3 of BE controller 134-1 performs or shares some of the tasks typically performed by management module 121-1 of FE controller 130. For example, in some embodiments, management module 121-3 of BE controller 134-1 monitors the status of executing commands at the NVM devices coupled to that management module, instead of management module 121-1 performing this function (as discussed in more detail below). In some embodiments, management module 121-3 of BE controller 134-1 monitors a portion of NVM devices 140, while management module 121-1 of storage controller 124 monitors the remainder of NVM devices 140. In some embodiments, management module 121-3 of BE controller 134-1 monitors a portion of NVM devices 140 (e.g., all NVM devices associated with the BE controller of which management module 121-3 is a component), and other management modules 121 associated with other BE controllers 134 monitor the remaining NVM devices 140.

As mentioned above, front-end controller 130 receives host write commands from the computer system 110 and determines the number of garbage collection writes to be performed. In some embodiments, the front-end controller 130 performs high-level scheduling, in which host writes and garbage collection writes are scheduled, while the back-end controllers 134-1 through 134-m perform low-level scheduling, in which garbage collection reads are scheduled based on the number of garbage collection writes. In some embodiments, the front-end controller 130 assigns respective operations (e.g., host writes, garbage collection writes, and/or garbage collection reads) to respective NVM devices 140 (e.g., during a specified time period).

Figure 2:
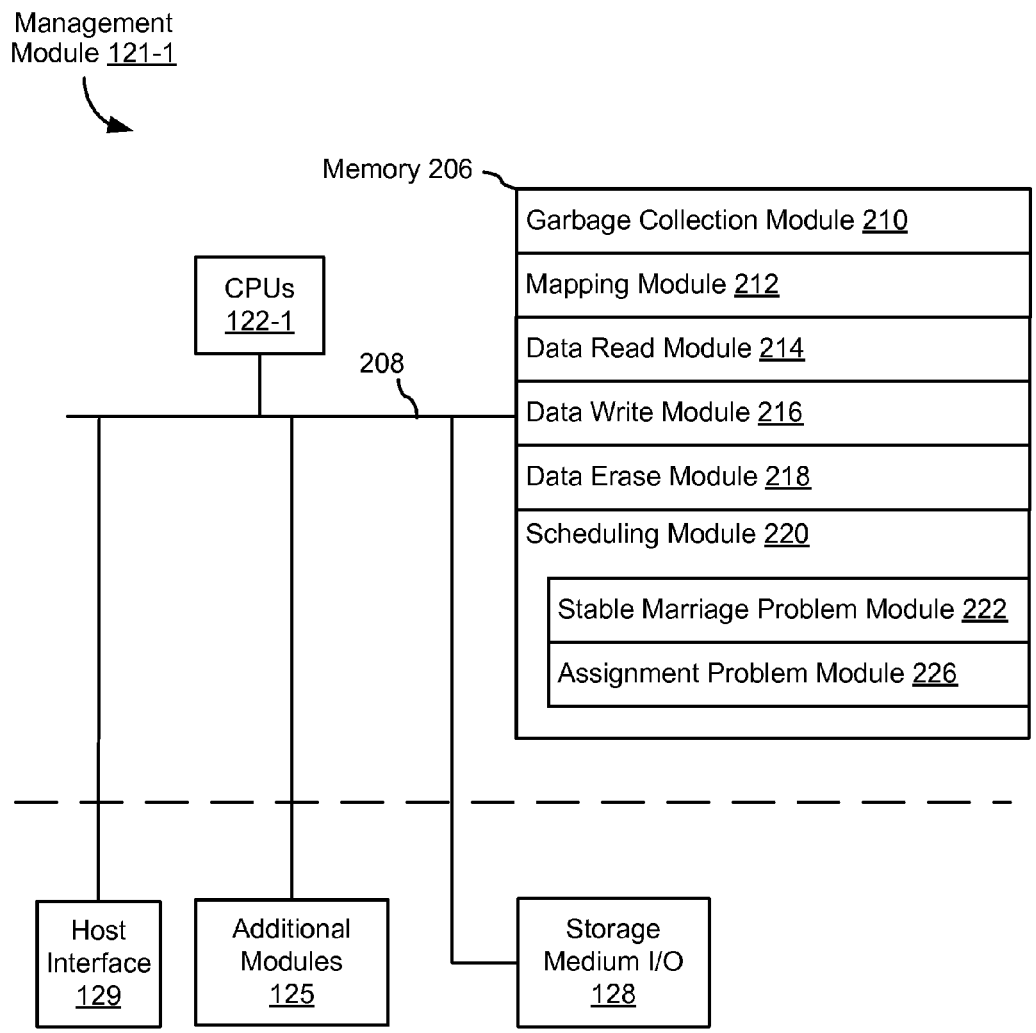
FIG. 2 is a block diagram illustrating a management module in a storage controller in accordance with some embodiments.

FIG. 2 is a block diagram illustrating a management module 121-1, in accordance with some embodiments, as shown in FIGS. 1A and 1B. Management module 121-1 typically includes one or more processing units (sometimes called CPUs or processors) 122-1 for executing modules, programs, and/or instructions stored in memory 206 (and thereby performing processing operations), memory 206 (sometimes called controller memory), and one or more communication buses 208 for interconnecting these components. The one or more communication buses 208 optionally include circuitry (sometimes called a chipset) that interconnects and controls communications between system components. Management module 121-1 is coupled to host interface 129, additional module(s) 125, and storage medium I/O 128 by the one or more communication buses 208.

Memory 206 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory 206 optionally includes one or more storage devices remotely located from the CPU(s) 122-1. Memory 206, or alternatively the non-volatile memory device(s) within memory 206, comprises a non-transitory computer readable storage medium.

In some embodiments, memory 206, or the non-transitory computer-readable storage medium of memory 206 stores the following programs, modules, and data structures, or a subset or superset thereof:

- garbage collection module 210 that is used for garbage collection for one or more blocks in a storage medium (e.g., storage medium 132, FIG. 1A or NVM devices 140, FIG. 1B);
- mapping module 212 that is used for mapping (e.g., using a mapping table) logical addresses in a logical address space to physical addresses, and for maintaining and updating one or more address mapping tables and/or related data structures;
- data read module 214 that is used for reading data from one or more codewords, pages, or blocks in a storage medium (e.g., storage medium 132, FIG. 1A or NVM devices 140, FIG. 1B);
- data write module 216 that is used for writing data to one or more codewords, pages, or blocks in a storage medium (e.g., storage medium 132, FIG. 1A or NVM devices 140, FIG. 1B);
- data erase module 218 that is used for erasing data from one or more blocks in a storage medium (e.g., storage medium 132, FIG. 1A or NVM devices 140, FIG. 1B); and
- scheduling module 220 that is used for mapping memory operation scheduling problems (sometimes called memory operation scheduling tasks) encountered in a storage device (e.g., storage device 120, FIG. 1A) into optimization problems and solving these problems to obtain a schedule of operation; in some embodiments, schedule module includes one or both of:
  - Stable Marriage Problem module 222 that is used for mapping scheduling problems to the Stable Marriage Problem and solving the Stable Marriage Problem to assign memory operations to memory devices (e.g., NVM devices 140, FIGS. 1A-1B); and
  - Assignment Problem module 226 that is used for mapping scheduling problems to the Assignment Problem and solving the Assignment Problem to assign memory operations to memory devices (e.g., NVM devices 140, FIGS. 1A-1B).

Each of the above identified elements may be stored in one or more of the previously mentioned memory devices, and corresponds to a set of instructions for performing a function described above. The above identified modules or programs (e.g., sets of instructions) need not be implemented as separate software programs, procedures or modules, and thus various subsets of these modules may be combined or otherwise re-arranged in various embodiments. In some embodiments, memory 206 may store a subset of the modules and data structures identified above. Furthermore, memory 206 may store additional modules and data structures not described above. In some embodiments, the programs, modules, and data structures stored in memory 206, or the non-transitory computer readable storage medium of memory 206, provide instructions for implementing some of the methods described below. In some embodiments, some or all of these modules may be implemented with specialized hardware circuits that subsume part or all of the module functionality.

Although FIG. 2 shows management module 121-1 in accordance with some embodiments, FIG. 2 is intended more as a functional description of the various features which may be present in management module 121-1 than as a structural schematic of the embodiments described herein. In practice, and as recognized by those of ordinary skill in the art, the programs, modules, and data structures shown separately could be combined and some programs, modules, and data structures could be separated.

In some embodiments, respective memory operations are performed as part of a memory process, which is managed by a storage controller (e.g., FE controller 130, FIG. 1B). Examples of memory processes include host write processes, host read processes, garbage collection write processes, and garbage collection read processes. Each memory process includes a plurality of memory operations, each of which is directed at a page (or other memory portion) in a respective memory device of a plurality of memory devices. Such a division of processes into operations is sometimes herein referred to as RAID striping.

FIG. 3 illustrates a plurality of host write processes 302-1 through 302-3, garbage collection (GC) write processes 304-1 through 304-3, and garbage collection read processes 306-1 through 306-3, in accordance with some embodiments. In the example shown in FIG. 3, the operations of each process 302, 304, or 306 are directed to respective pages in a plurality of NVM devices 140-1 through 140-r (e.g., a subset of the NVM devices of FIG. 1A or 1B). However, in some other examples, the operations of each process are directed to pages in a set of NVM devices that form a RAID stripe, and various ones of the processes 302, 304, 306 are directed to different RAID stripes having different NVM devices. For example, storage medium 132 may contain many RAID stripes, with each RAID stripe having a predefined number (e.g., r=8, 16 or 32) of the n NVM devices in storage medium 132. Solely for ease of explanation, examples explained with respect to FIG. 3 are assumed to all relate to the same RAID strip of r NVM devices, 140-1 to 140-r.

The operations for a respective process are not necessarily performed simultaneously. For example, for host write process 302-1, the operations directed to NVM devices 140-1 through 140-3 and to 140-r have already been performed, as indicated by the check marks, while the operation directed to NVM device 140-4 has not yet been performed, as indicated by the absence of a check mark. A process is complete when all of its operations have been performed.

Figure 6A:
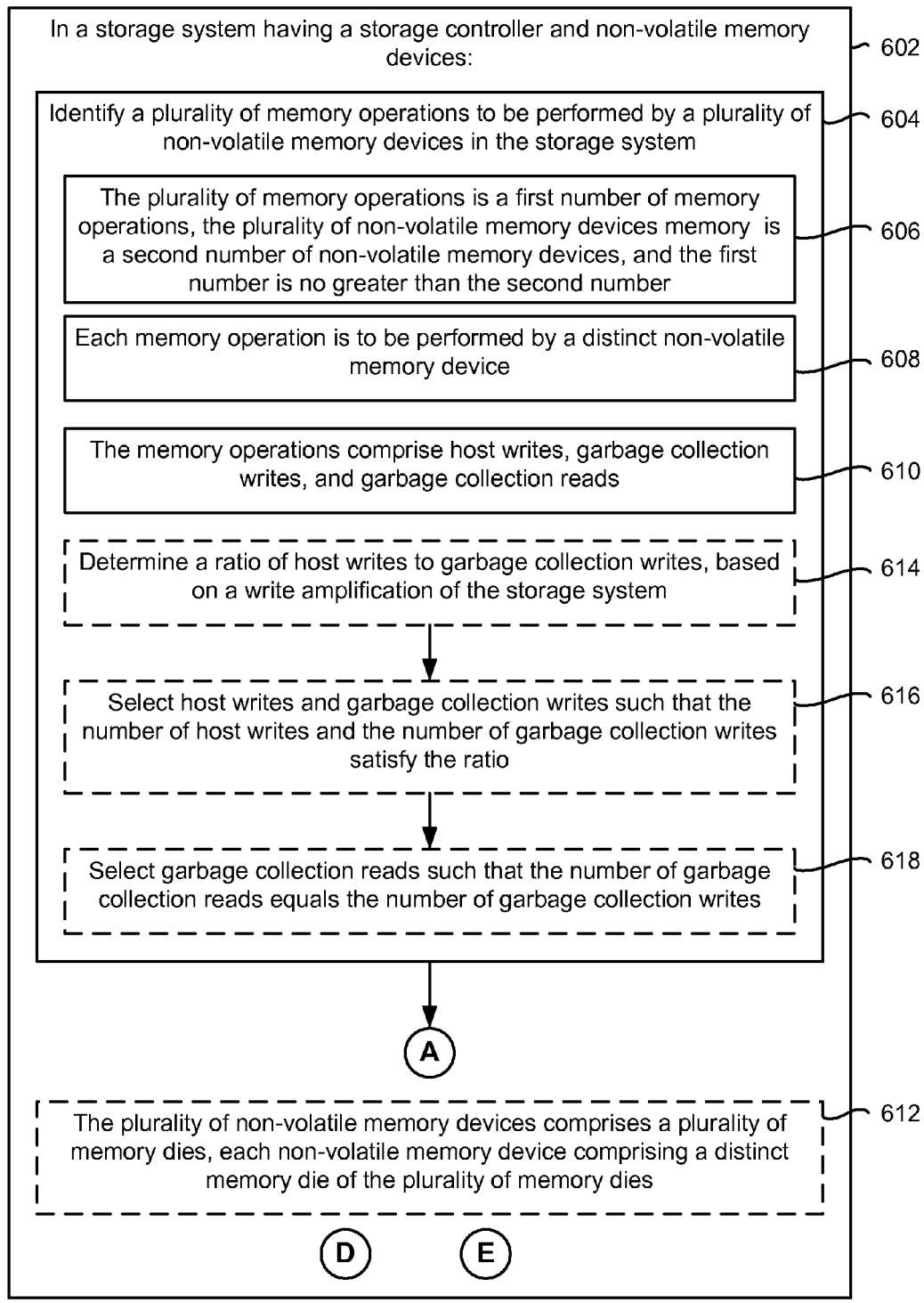
Figure 6B:
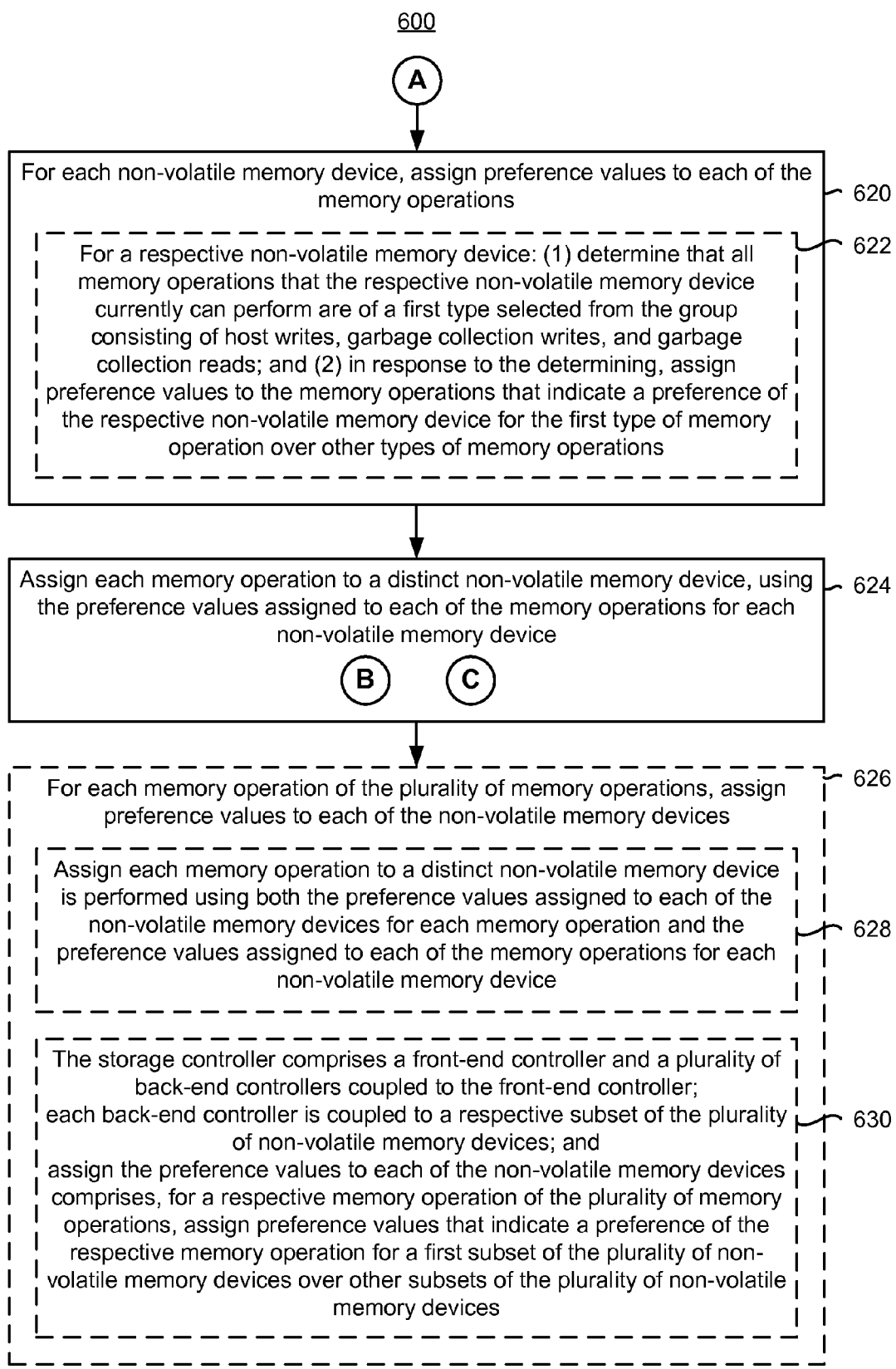
Figure 6C:
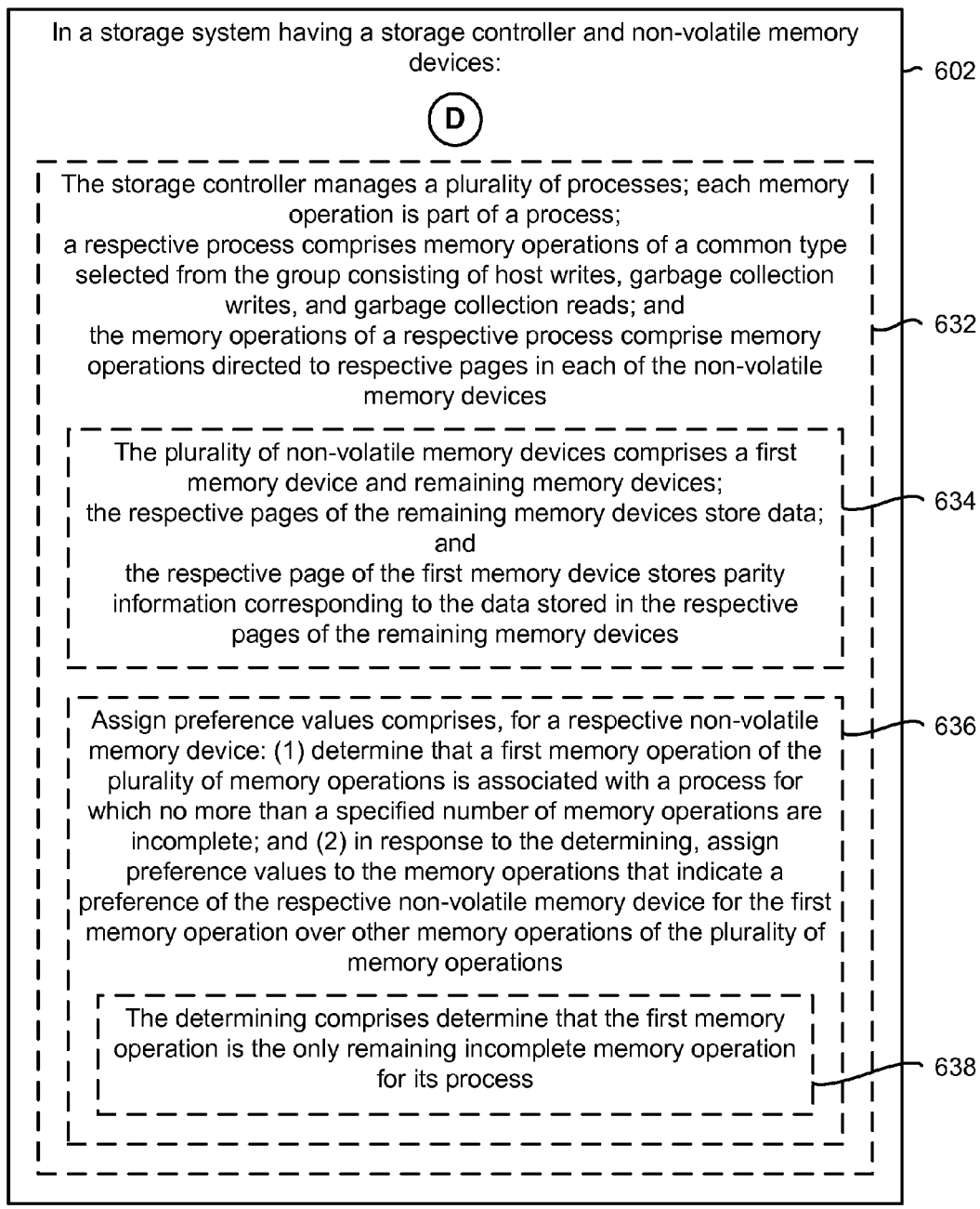
Figure 6E:
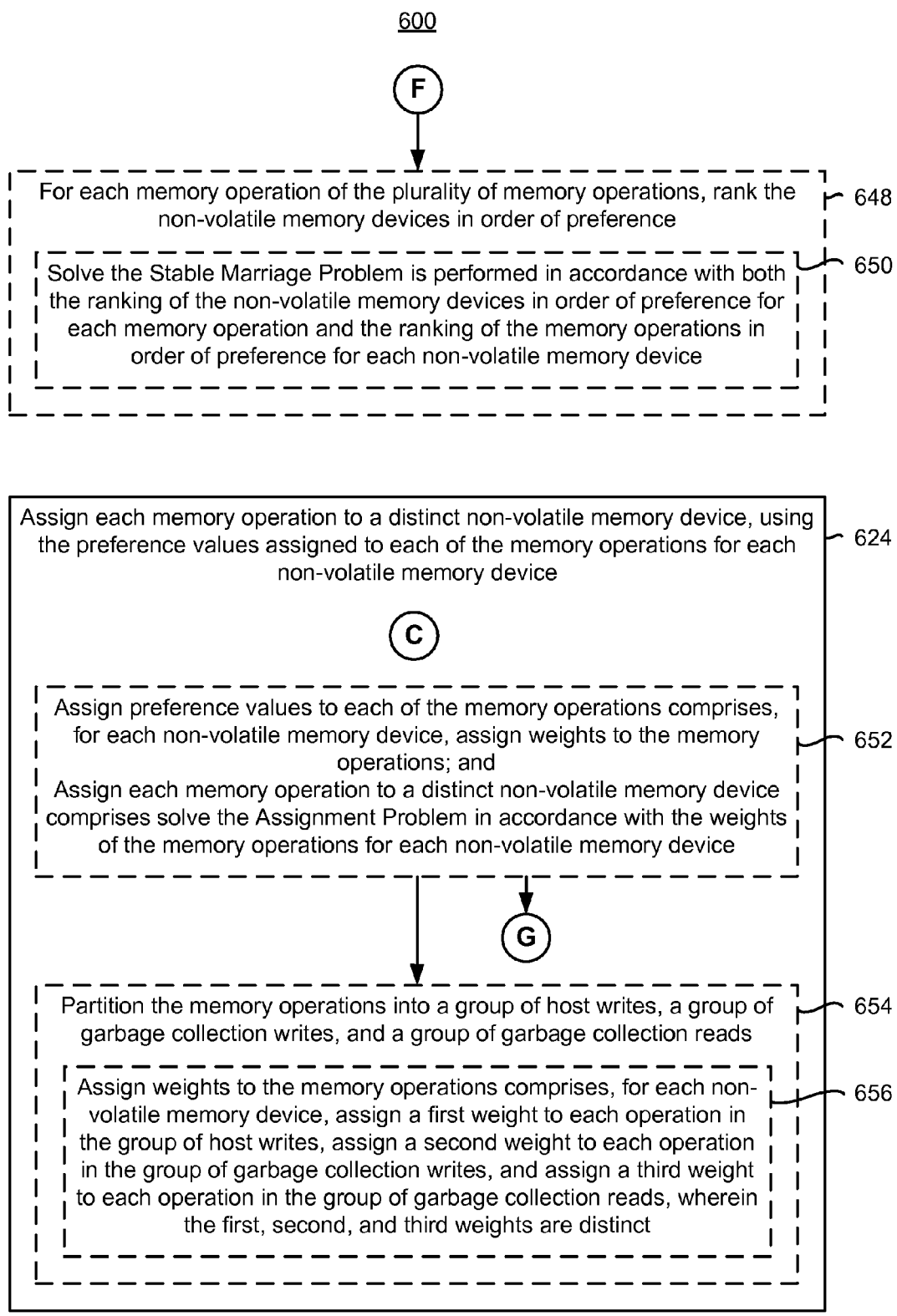
Figure 6F:
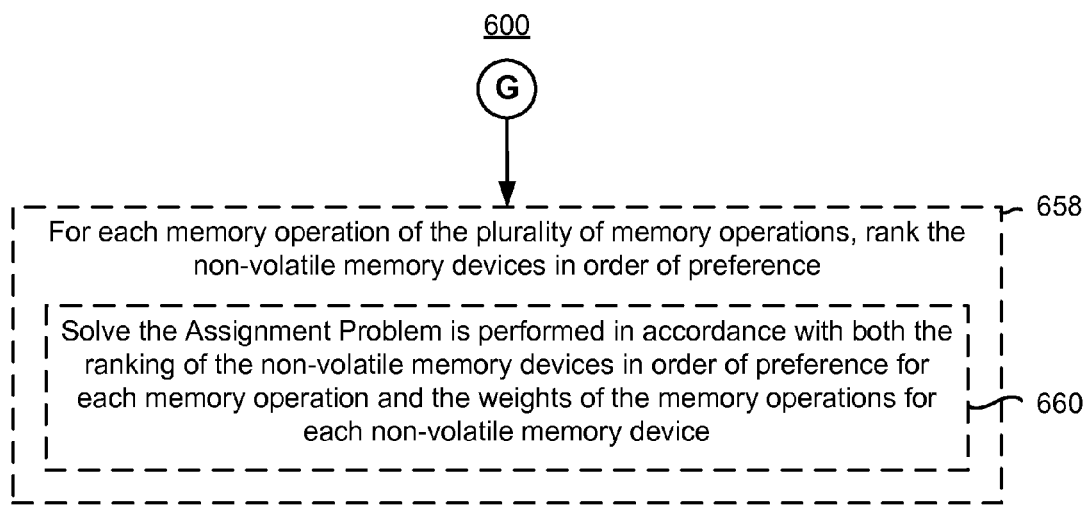

In some embodiments, the status of processes is used to determine (e.g., for assignment 620, FIG. 6B) the preferences of respective NVM devices 140 for performing particular operations. If a NVM device 140 is holding up completion of a particular process, or is one of a specified number (e.g., a few, such as two or three) NVM devices 140 holding up completion of a process, then the NVM device 140 will have a preference for performing the operation associated with the particular process as compared to other operations, in accordance with some embodiments. For example, if NVM device 140-4 is the only NVM device that has not performed its host write operation for host write process 302-1, then NVM device 140-4 has a preference for performing this operation instead of other potential operations. Likewise, NVM device 140-2 has a preference for performing a garbage collection write for garbage collection write process 304-1 and NVM device 140-n has a preference for performing a garbage collection read for garbage collection read process 306-2. In another example, NVM devices 140-3 and 140-4 have preferences for performing garbage collection writes for garbage collection write process 304-2, because they are the only two devices holding up completion of garbage collection write process 304-2. The preference of NVM device 140-4 for performing this garbage collection write process 304-2, however, is not as strong as its preference for performing host write process 302-1, because it is the only device holding up completion of host write process 302-1.

In some embodiments, a NVM device 140 has a preference for performing a particular operation and/or a particular type of operation (e.g., host write, garbage collection write, or garbage collection read) if there are no other types of memory operations to be performed. For example, NVM device 140-1 has a preference for performing a host write for host write process 302-3, because no garbage collection writes or reads are available for it to perform.

In some embodiments, a NVM device 140 has a preference for performing a garbage collection read if there are no host writes and garbage collection writes for it to perform. The data accessed in the garbage collection read is buffered (e.g., in the RAM 150) for subsequent write back to the storage medium 132.

In some embodiments, the plurality of NVM devices 140 (e.g., the set of NVM devices in a RAID stripe) include a first memory device and remaining memory devices. For each process, a page in the first memory NVM device 140 stores parity information, while pages in the remaining NVM devices 140 of the plurality of NVM devices store data corresponding to the parity information. For example, in some embodiments, storage device 120 uses deterministic parity: a single NVM device (e.g., NVM device 140-k) always stores parity information, while the other NVM devices store data. In some other embodiments, the storage device 120 uses last-man-out parity: the parity information is written to the last NVM device to be written in a RAID stripe, such that the NVM device storing parity information varies from process to process.

Figure 4A:
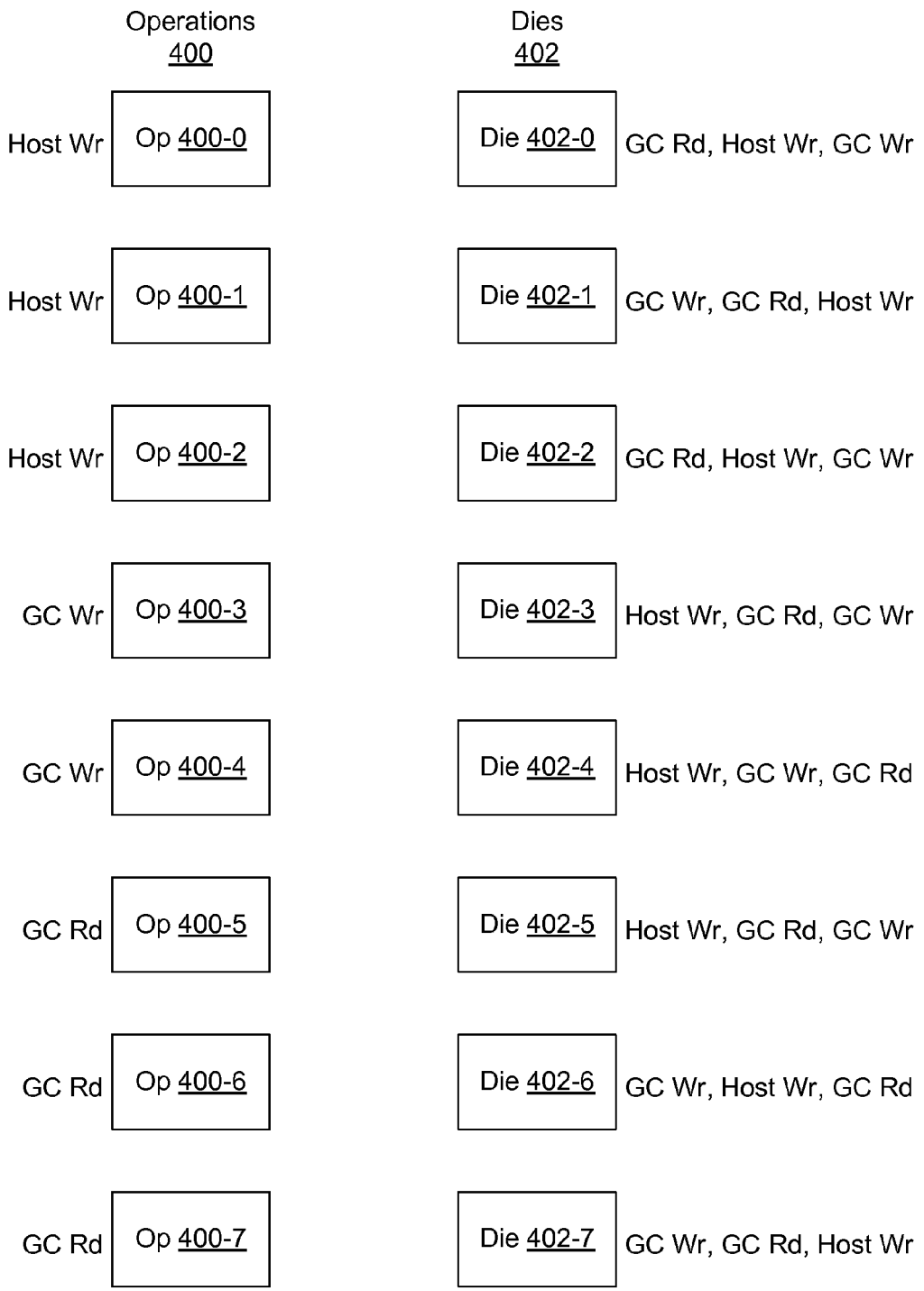
FIGS. 4A-4C illustrate the assignment of operations to NVM dies through solution of the Stable Marriage Problem in accordance with some embodiments.
Figure 4B:
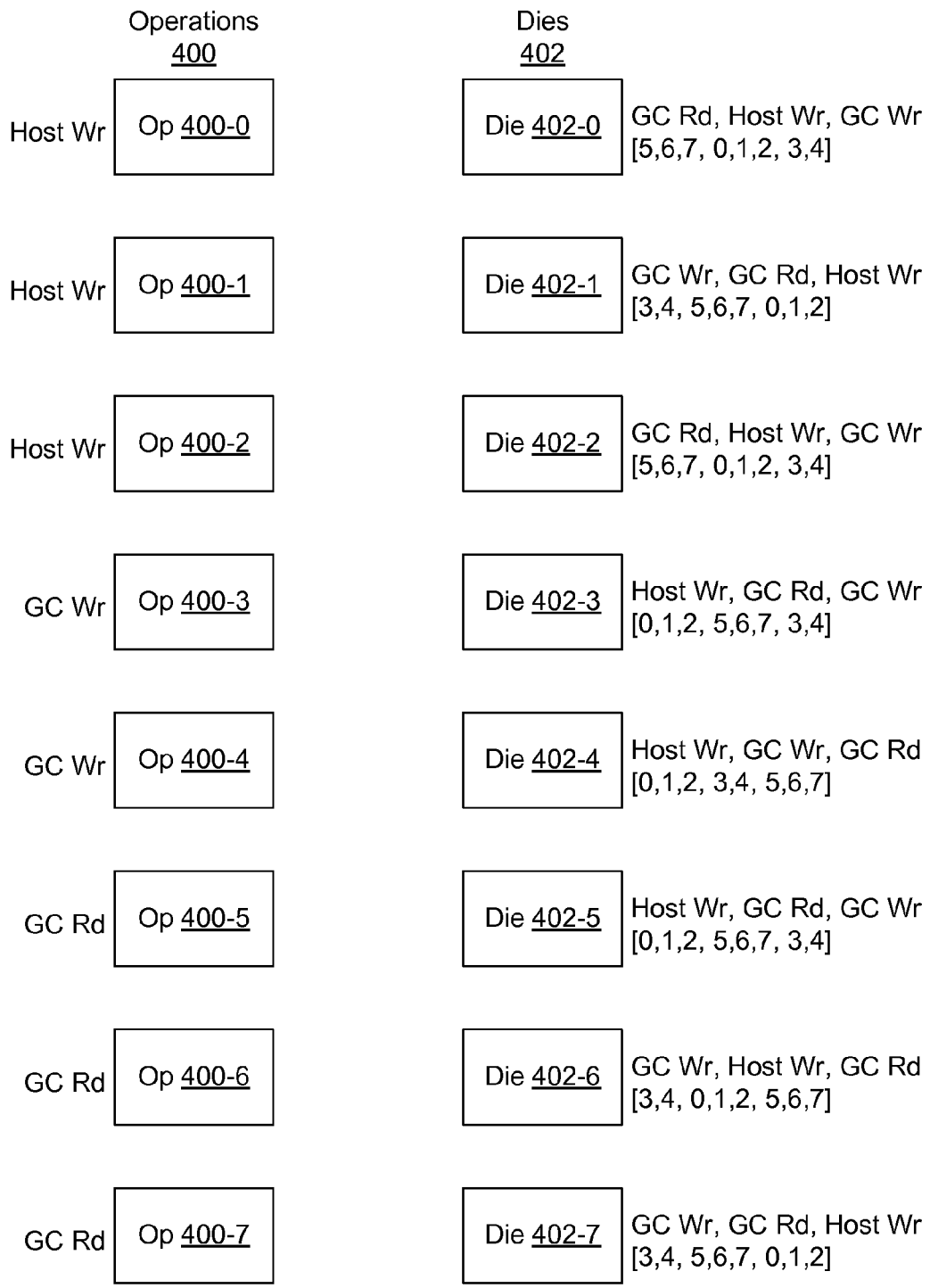
Figure 4C:
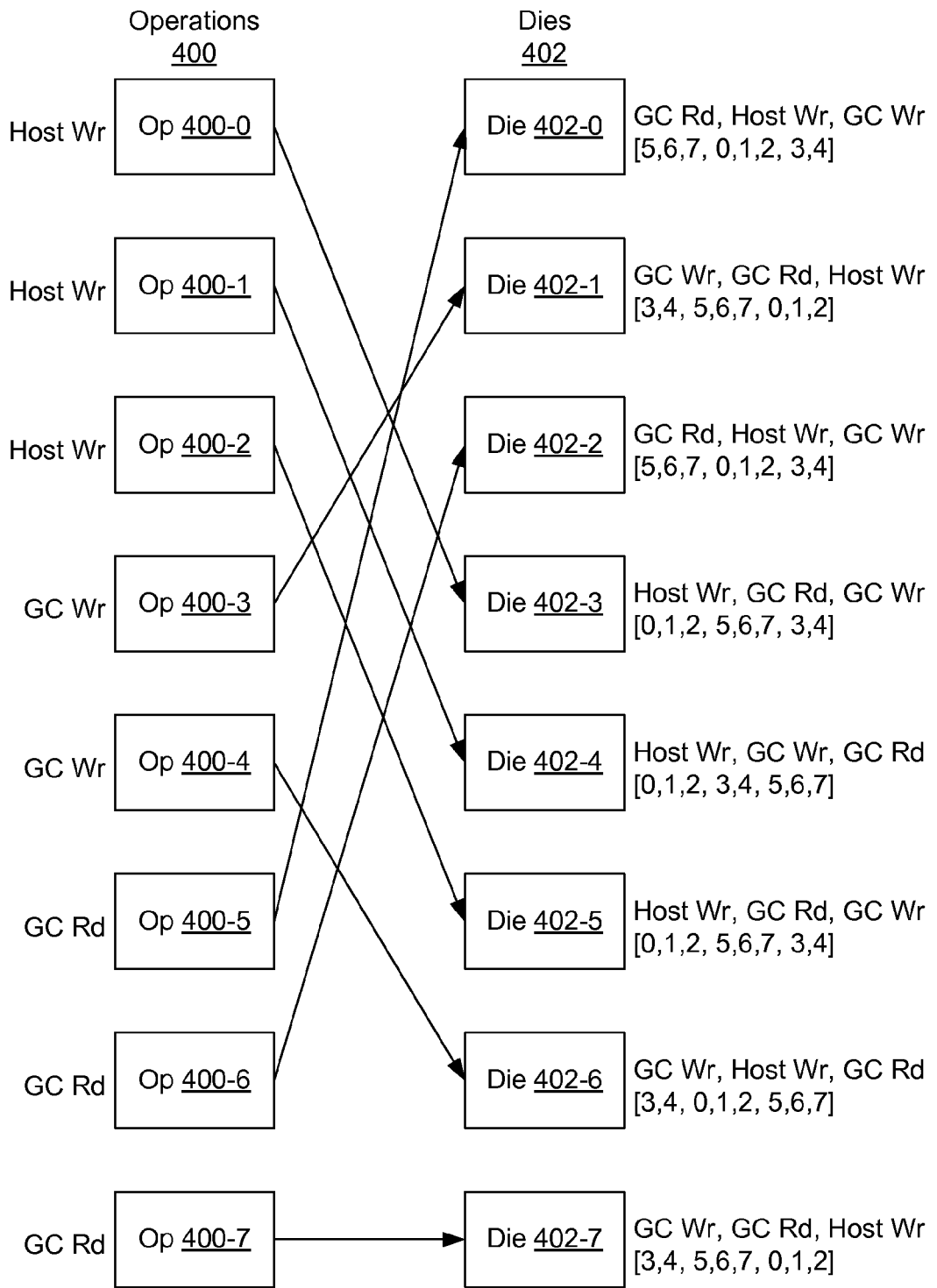

FIGS. 4A-4C illustrate the assignment of operations 400 to NVM dies 402 (or other NVM devices) through solution of the Stable Marriage Problem in accordance with some embodiments. In some embodiments, the assignment is performed in a storage controller (e.g., FE controller 130, FIG. 1B). The storage controller identifies a plurality of memory operations 400 to be performed by a plurality of non-volatile memory devices (e.g., dies 402) in a storage system. In the example shown in FIG. 4A, the number of memory operations 400 identified equals the number of non-volatile memory devices in the plurality of non-volatile memory devices (e.g., 8 operations 400-0 through 400-8 to be performed by 8 dies 402-0 through 402-7), but more generally, the number of memory operations is no greater than the number of non-volatile memory devices, and in some embodiments or circumstances, the number of identified memory operations is less than the number of non-volatile memory devices that are candidates for executing those memory operations. Each memory operation 400 shown in FIG. 4A is to be performed by a distinct non-volatile memory device (e.g., die 402). In some embodiments, the set of memory devices to which the memory operations are to be assigned are memory devices in a single RAID stripe.

In some embodiments, memory operations 400 include host writes, garbage collection writes, and garbage collection reads. It is noted that in these embodiments, memory operations 400 do not include host reads, since host reads are directed to specific addresses, which correspond to specific die, and therefore host reads cannot be reassigned to die other than the specific die(s) that contain the data requested by the host reads. Operations 400 are partitioned into distinct groups, and each group is of a type of operation. For example, FIG. 4A illustrates three exemplary groups of operations. Operations 400-0, 400-1, and 400-2 are in a group of host writes, operations 400-3 and 400-4 are in a group of garbage collection writes, and operations 400-5, 400-6, and 400-7 are in a group of garbage collection reads. The storage system (e.g., the storage controller of the storage system) determines the ratio of host writes, garbage collection writes, and garbage collection reads it requires. In some embodiments, the determination is based on the write amplification calculation, as explained above with respect to FIG. 1A.

After identifying the memory operations 400 and the non-volatile devices (e.g., the dies 402 in a RAID stripe), for each non-volatile memory device (e.g., die 402), the storage system assigns preference values to each of the memory operations. In some embodiments, ranking of the memory operations 400 in order of preference is performed for each non-volatile memory device. For example, in FIG. 4A, the storage system ranks, for each die 402, the type of operations (e.g., host write, garbage collection write, and garbage collection read) that die needs to perform. FIG. 4A shows the ranked groups of operations for each die 402, in the order of preference for that die (e.g., the order of preference for die 402-0 is garbage collection reads, then host writes, and then garbage collection writes).

Having assigned the group preferences for each die, the storage system ranks, for each die, the operations within each group in the order of preference, as shown in FIG. 4B. For example, for die 402-1, the storage system ranks garbage collection write operations 400-3 and 400-4 as having the highest preference, and thus in this example die 402-1 has a preference for performing operation 400-3 instead of operation 400-4. In some embodiments, the preference value determination described above with respect to FIG. 3 is used for determining preferences of operations within each group.

Using the preference values assigned to each of the memory operations for each non-volatile memory device, the storage system then assigns each memory operation to a distinct non-volatile memory device, as shown in FIG. 4C. In some embodiments, the assignment is performed by solving the Stable Marriage Problem. As shown in FIG. 4C, dies 402-0, 402-1, and 402-3 are assigned their respective preferred operations 400-5, 400-3, and 400-0; dies 402-2, 402-4, and 402-6 are assigned their respective secondary preferences 400-6, 400-1, and 400-4, and dies 402-5 and 402-7 are assigned their third 400-2 and fifth 400-7 preferences, respectively. The result of the assignment is that there are no dies and operations that would rather be assigned (e.g., married) to each other than with their respective assignment.

Although FIGS. 4A-4C show preference values for operations assigned to each non-volatile device, in some embodiments, preference values for each non-volatile device are assigned to each operation, and then the storage system ranks, for each operation 400, non-volatile devices 402 based on system needs. Likewise, although FIGS. 4A-4C show partitioning operations into groups based on memory operation types, and then ranking the operations within each group, in some embodiments, each die 420 can rank each operation without such grouping to ensure a fair distribution of operations over time.

Figure 5B:
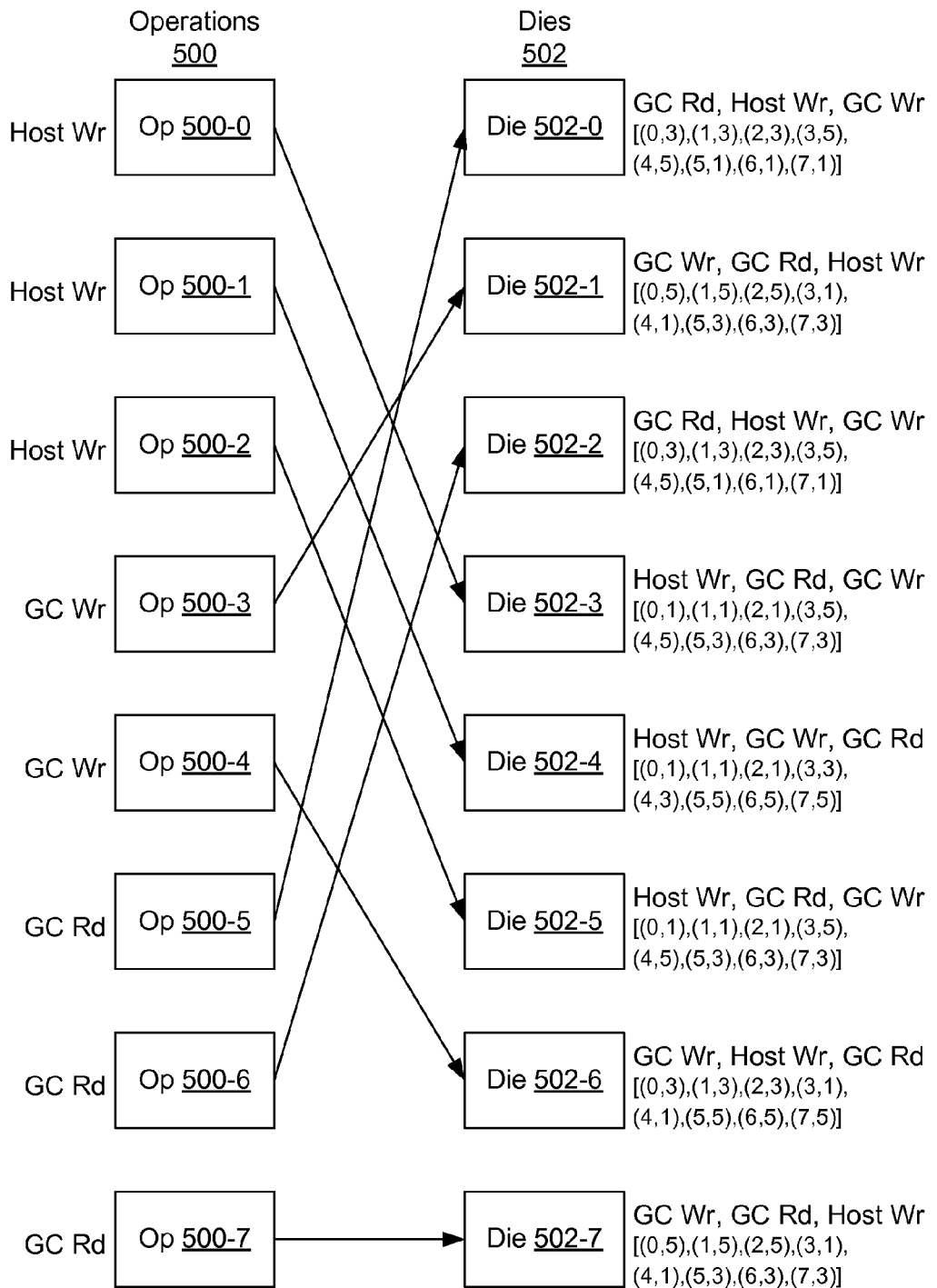

FIGS. 5A and 5B illustrate the assignment of operations 400 to NVM dies 402 (or other NVM devices) through solution of the Assignment Problem in accordance with some embodiments. In some embodiments, the assignment is performed by a storage controller (e.g., FE controller 130, FIG. 1B) in a storage system. To avoid needless repetition of explanations already provided above, features and components of operations and dies already shown in FIGS. 4A-4C and described above, and shown again in FIGS. 5A and 5B, are not described again here, and instead only different features and components are described with respect to FIGS. 5A and 5B.

As a non-limiting example, after identifying a plurality of memory operations 500 to be performed by a plurality of non-volatile memory devices (e.g., the dies 502 in a RAID stripe), and assigning preference values for each die, the in a storage system assigns weight to each operation, as shown in FIG. 5A. For example, operations 500-0, 500-1, and 500-2 are in a group of host writes, operations 500-3 and 500-4 are in a group of garbage collection writes, and operations 500-5, 500-6, and 500-7 are in a group of garbage collection reads. The order of group preference for die 502-0 is garbage collection reads, then host writes, and then garbage collection writes. The in a storage system assigns weight value 3 to operations 500-0, 500-1, and 500-2 in the host write group, weight value 5 to operations 500-3 and 500-4 in the garbage collection write group, and weight value 1 to operations 500-5, 500-6, and 500-7 in the garbage collection read group.

In accordance with the weights assigned to memory operation for each non-volatile memory device, the in a storage system assigns each memory operation to a distinct non-volatile memory device, as shown in FIG. 5B. In some embodiments, the assignment is performed by solving the Assignment Problem. As shown in FIG. 5B, dies 502-0 through 502-6 are assigned their respective least costly operations 500-5, 500-3, 500-6, 500-0, 500-1, 502-2, and 500-4, and die 502-7 is assigned to operation 500-7 with weight value of 3. The result of the assignment is that the total cost (e.g., the sum of weights, 1+1+1+1+1+1+1+3) is minimized.

Although FIGS. 5A and 5B show preference values for memory operations assigned to each non-volatile device, in some embodiments, preference values for each non-volatile device are assigned to each memory operation, and the in a storage system ranks, for each operation 500, non-volatile devices 502 based on system needs. Likewise, although FIGS. 5A and 5B show partitioning operations into groups based on memory operation types, and then ranking the operations within each group, in some embodiments, a storage device 124 (or its management module 121), or a host device performing management tasks for storage device 124, can rank, for each die 420, each operation without such grouping to ensure a fair distribution of operations over time.

Additional details concerning each of the processing steps discussed above for scheduling memory operations, including mapping into the Stable Marriage Problem and the Assignment Problem and solving accordingly, are presented below with reference to FIGS. 6A-6F.

FIGS. 6A-6F illustrate flowchart representations of a method 600 of managing a storage system, in accordance with some embodiments. Method 600 is sometimes herein called a memory operation scheduling process or memory operation scheduling method. With reference to the data storage systems 100 depicted in FIGS. 1A and 1B, in some embodiments, the method 600 is performed by a storage device (e.g., storage device 120) or one or more components of the storage device (e.g., storage controller 124 and/or FE controller 130). In some embodiments, the storage device is operatively coupled with a host system (e.g., computer system 110). In some embodiments, the method 600 is governed by instructions that are stored in a non-transitory computer-readable storage medium and that are executed by one or more processors of a device, such as the processing unit (CPU) 122-1 of management module 121-1 and/or the one or more processing units (CPUs) of management module 121-3.

In some embodiments, some of the operations of method 600 are performed at a host (e.g., computer system 110) and other operations of method 600 are performed at a storage device (e.g., storage device 120). In some embodiments, method 600 is governed, at least in part, by instructions that are stored in a non-transitory computer-readable storage medium and that are executed by one or more processors of a host (not shown in FIGS. 1A and 1B).

For ease of explanation, the following describes the method 600 as performed by a storage device (e.g., by storage controller 124 of storage device 120, FIGS. 1A and 1B, and/or by FE controllers 130, FIG. 1B). With reference to FIG. 2, in some embodiments, the operations of method 600 are performed, at least in part, by a garbage collection module (e.g., garbage collection module 210), a mapping module (e.g., mapping module 212), a data read module (e.g., data read module 214), a data write module (e.g., data write module 216), a data erase module (e.g., data erase module 218), and a scheduling module (e.g., scheduling module 220) of management module 121-1 and/or management module 121-3. However, those skilled in the art will appreciate that in other embodiments, one or more of the operations described in storage system management method 600 are performed by a host (e.g., computer system 110).

In (602) a storage system having a storage controller (e.g., storage controller 124, FIG. 1A and/or FE controller 130, FIG. 1B) and non-volatile storage, the storage system (e.g., the storage controller or a component, e.g., management module 121-1, of the storage controller) identifies (604) a plurality of memory operations to be performed by a plurality of non-volatile memory devices (e.g., NVM devices 140, FIGS. 1A and 1B) in the storage system. In some embodiments, the plurality of non-volatile memory devices (e.g., NVM devices 140, FIGS. 1A and 1B) comprises (612) a plurality of memory dies (e.g., dies 402 or 502, FIGS. 4A-5B), and each non-volatile memory device comprises a distinct memory die of the plurality of memory dies. As shown in FIGS. 4A-5B and described above, in some embodiments, the number of memory operations in the plurality of memory operations is no greater than (606) the number of non-volatile memory devices in the plurality of non-volatile memory devices (e.g., 8 or fewer operations are to be performed by 8 dies, FIGS. 4A-5B), each memory operation is (608) to be performed by a distinct non-volatile memory device, and the memory operations comprise (610) host writes, garbage collection writes, and garbage collection reads, but not host reads. While the number of identified memory operations may be less than the number of non-volatile memory devices in some circumstances or in some embodiments, for ease of explanation, the operation of method 600 will be explained for the situation where the number of identified memory operations equals the number of non-volatile memory devices.

As described above with respect to FIGS. 1A and 4A-5B, in some embodiments, while identifying the plurality of memory operations, the storage system first determines (614) a ratio of host writes to garbage collection writes, based on a write amplification of the storage system. The storage system further selects (616) host writes and garbage collection writes such that the number of host writes and the number of garbage collection writes satisfy the ratio and selects (618) garbage collection reads such that the number of garbage collection reads equals the number of garbage collection writes. Alternatively, the storage system, when selecting garbage collection reads, selects garbage collection reads so that the number of garbage collection reads equals the number of garbage collection writes over time, without requiring that the number of garbage collection reads equals the number of garbage collection writes during each cycle of the memory operation scheduling process 600.

Having identified the memory operations and the non-volatile devices, for each non-volatile memory device, the storage system assigns (620) preference values to each of the memory operations. In some embodiments, for a respective non-volatile memory device, the storage system first determines (622) that all memory operations that the respective non-volatile memory device currently can perform are of a first type selected from the group consisting of host writes, garbage collection writes, and garbage collection reads. Based on the determination, the storage device assigns preference values to the memory operations that indicate a preference of the respective non-volatile memory device for the first type of memory operation over other types of memory operations. For example, in FIG. 4A, the storage device assigns preference values that indicate a preference of die 402-2 for garbage collection read over other types of memory operations. Using the preference values assigned to each of the memory operations for each non-volatile memory device, the storage device assigns (624) each memory operation to a distinct non-volatile memory device for scheduling operations in non-volatile memory devices.

In some embodiments, the preference values are assigned to not only the memory operations, but also the non-volatile memory devices. In some embodiments, for each memory operation of the plurality of memory operations, the storage system assigns (626) preference values to each of the non-volatile memory devices so that assigning (628) each memory operation to a distinct non-volatile memory device is performed using both the preference values assigned to each of the non-volatile memory devices for each memory operation and the preference values assigned to each of the memory operations for each non-volatile memory device. Furthermore, as described below (e.g., see description of operations 648 and 658), in some embodiments, preference values are assigned to non-volatile memory devices, but not to memory operations.

In some embodiments, the storage controller (e.g., storage controller 124, FIG. 1A) comprises (630) a front-end controller (e.g., FE controller 130, FIG. 1B) and a plurality of back-end controllers (e.g., BE controller 134, FIG. 1B) coupled to the front-end controller. Each back-end controller is also coupled to a respective subset of the plurality of non-volatile memory devices (e.g., BE controller 134-1 is coupled to NVM devices 140-1, 140-2 . . . 140-k of the plurality of NVM memory devices 140). With respect to operation 626, The storage system assigns the preference values to each of the non-volatile memory devices by, for a respective memory operation of the plurality of memory operations, assigning preference values that indicate a preference of the respective memory operation for a first subset of the plurality of non-volatile memory devices over other subsets of the plurality of non-volatile memory devices. For example, in the exemplary setting shown in FIG. 1B, FE controller 130 may assign preference values that indicate a preference of a host write operation for NVM devices 140-1, 140-2 . . . 140-k coupled to BE controller 134-1 over other NVM devices 140-k+1. . . 140-n.

In some embodiments, the storage system (e.g., storage controller 124, FIG. 1A and/or FE controller 130, FIG. 1B, of storage device 120) manages (632) a plurality of processes, each memory operation is part of a process, and a respective process comprises memory operations of a common type selected from the group consisting of host writes, garbage collection writes, and garbage collection reads. For example, as shown in FIG. 3 and explained above, host write processes 302 are of type host writes, garbage collection write processes 304 are of type garbage collection writes, and garbage collection read processes 306 are of type garbage collection reads. The operations of each process 302, 304, or 306 are directed to respective pages in each of the NVM devices 140-1 through 140-r.

In some embodiments, the memory operations of a respective process comprise memory operations directed to respective pages in each of the non-volatile memory devices. The plurality of non-volatile memory devices comprises (634) a first memory device and remaining memory devices, such that the respective pages of the remaining memory devices store data and the respective page of the first memory device stores parity information corresponding to the data stored in the respective pages of the remaining memory devices. In some embodiments, assigning preference values comprises (636), for a respective non-volatile memory device, first determining that a first memory operation of the plurality of memory operations is associated with a process for which no more than a specified number of memory operations are incomplete, and in response to the determining, assigning preference values to the memory operations that indicate a preference of the respective non-volatile memory device for the first memory operation over other memory operations of the plurality of memory operations. For example, in FIG. 3, the storage system first determines that there are no more than a specified number of incomplete memory operations for garbage collection write process 304-2, and one of those incomplete operations is to be performed by NVM device 140-3. In response to the determining, the storage system assigns preference values to the memory operations that indicate a preference value of NVM device 140-3 for a garbage collection write operation over other memory operations.

In some embodiment, the determining in operation 636 comprises (638) determining that the first memory operation is the only remaining incomplete memory operation for its process. For example, in FIG. 3, the storage system determines a host write operation to be performed by NVM device 140-4 in host write process 302-1 is the only remaining incomplete memory operation for host write process 302-1. In response the determining, the storage system assigns preference values to the memory operations that indicate a preference of NVM device 140-4 for the first memory operation, which is a host write operation in this example, over other memory operations of the plurality of memory operations.

In some embodiments, the storage controller (e.g., storage controller 124, FIG. 1A) comprises (640) a front-end controller (e.g., FE controller 130, FIG. 1B) and a plurality of back-end controllers (e.g., BE controllers 134, FIG. 1B) coupled to the front-end controller. Each back-end controller (e.g., BE controllers 134, FIG. 1B) is coupled to a respective subset of the plurality of non-volatile memory devices (e.g., BE controller 134-1 is coupled to NVM 140-1, 140-2 . . . 140-k of storage medium 132, FIG. 1B). As explained above with respect to FIG. 1A, in some embodiments, due to write amplification, after the front-end controller receives host write requests, the front-end controller schedules garbage collection writes in accordance with the host write requests, and the back-end controllers schedule garbage collection reads such that each garbage collection read corresponds to a respective garbage collection write. The front-end controller then performs the identifying, the assigning of preference values, and the assigning of each memory operation as described above.

In some embodiments, the storage system assigns operations to non-volatile memory device through solution of the Stable Marriage Problem, as shown in FIGS. 4A-4C. While solving the Stable Marriage Problem, the preference assignment is performed by ranking (642) the memory operations in order of preference for each non-volatile memory device (FIG. 4B), and the assignment of memory operations to distinct non-volatile memory devices is accomplished by solving the Stable Marriage Problem in accordance with the ranking of the memory operations in order of preference for each non-volatile memory device (FIG. 4C).

In some embodiments, as shown in FIG. 4A and described above, the storage system partitions (644) the memory operations into a group of host writes, a group of garbage collection writes, and a group of garbage collection reads. When grouping is performed, the storage system ranks the memory operations in order of preference by ranking (646) the groups and ordering the memory operations by the ranked groups. For example, in FIG. 4A, for die 402-3, the storage device ranks the groups in order of preference, first host writes, then garbage collection reads, and then garbage collection writes. The storage system then orders the memory operations for die 402-3 by the ranked groups of operations 0 through 2, which belong to the host write group, followed by operations 5 through 7, which belong to the garbage collection read group, then operations 3 and 4, which belong to the garbage collection write group.

In some embodiments, preference values are assigned to each non-volatile device as shown in FIGS. 4A-4C. Alternatively or additionally, in some embodiments, preference values for each non-volatile device are assigned to each memory operation such that for each memory operation of the plurality of memory operations, the storage system ranks (648) the non-volatile memory devices in order of preference. In such embodiments, the storage system solves (650) the Stable Marriage Problem in accordance with both the ranking of the non-volatile memory devices in order of preference for each memory operation and, if applicable, the ranking of the memory operations in order of preference for each non-volatile memory device.

In some embodiments, the storage system assigns operations to non-volatile memory devices through solution of the Assignment Problem, as shown in FIGS. 5A-5B. While solving the Assignment Problem, the preference assignment is performed by assigning (652) weights to the memory operations for each non-volatile memory device, assigning weights to the memory operations (FIG. 5A), and the memory operation assignment is accomplished through solving the Assignment Problem in accordance with the weights of the memory operations for each non-volatile memory device (FIG. 5B).

In some embodiments, as shown in FIG. 5A and described above, the storage system partitions (654) the memory operations into a group of host writes, a group of garbage collection writes, and a group of garbage collection reads. When grouping is performed, assigning weights to the memory operations comprises (656), for each non-volatile memory device, assigning a first weight to each operation in the group of host writes, assigning a second weight to each operation in the group of garbage collection writes, and assigning a third weight to each operation in the group of garbage collection reads, wherein the first, second, and third weights are distinct. For example, in FIG. 5A, for die 502-3, the storage system partitions memory operations 500 into a group of host writes, a group of garbage collection writes, and a group of garbage collection reads, and assigns distinct weights of 1, 5, and 3 to the host write group, the garbage collection read group, and the garbage collection write group respectively.

As explained above, in some embodiments, preference values are assigned to each non-volatile device as shown in FIGS. 5A-5B. Alternatively or additionally, in some embodiment, preference values for each non-volatile device are assigned to each operation such that for each memory operation of the plurality of memory operations, the storage device ranks (658) the non-volatile memory devices in order of preference. In such embodiments, the storage device solves (660) the Assignment Problem in accordance with the ranking of the non-volatile memory devices in order of preference for each memory operation, and if applicable, the weights of the memory operations for each non-volatile memory device.

It will be understood that, although the terms "first," "second," etc. may be used herein to describe various elements, these elements should not be limited by these terms. These terms are only used to distinguish one element from another. For example, a first transistor could be termed a second transistor, and, similarly, a second transistor could be termed a first transistor, without changing the meaning of the description, so long as all occurrences of the "first transistor" are renamed consistently and all occurrences of the "second transistor" are renamed consistently. The first transistor and the second transistor are both transistors, but they are not the same transistor.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method of managing a storage system, the method comprising:
   in the storage system, which includes a storage controller and non-volatile memory devices:
      identifying a plurality of memory operations to be performed by a plurality of the non-volatile memory devices in the storage system, wherein
         the plurality of memory operations comprises a first number of memory operations and the plurality of non-volatile memory devices comprises a second number of memory devices,
         the first number is no greater than the second number,
         each memory operation of the plurality of memory operations is to be performed by a distinct non-volatile memory device, and
         the memory operations comprise host writes, garbage collection writes, and garbage collection reads;
      for each non-volatile memory device in the plurality of non-volatile memory devices, assigning preference values to each of the memory operations in the plurality of memory operations, wherein assigning preference values comprises, for a respective non-volatile memory device:
         determining that a first memory operation of the plurality of memory operations is associated with a process for which no more than a specified number of memory operations are incomplete; and
         in response to the determining, assigning preference values to the memory operations that indicate a preference of the respective non-volatile memory device for the first memory operation over other memory operations of the plurality of memory operations; and
      assigning each memory operation in the plurality of memory operations to a distinct non-volatile memory device in the plurality of non-volatile memory devices, using the preference values assigned to each of the memory operations for each non-volatile memory device;
   wherein:
      assigning each memory operation to a distinct non-volatile memory device comprises:
         solving a predefined combinatorial optimization problem, known as The Stable Marriage Problem using the Gale-Shapely algorithm; or
         solving a predefined combinatorial optimization problem, known as The Assignment Problem using the Hungarian algorithm; and
   wherein:
      the storage controller manages a plurality of processes;
      each memory operation is part of a process;
      a respective process comprises memory operations of a common type selected from the group consisting of host writes, garbage collection writes, and garbage collection reads; and
      the memory operations of a respective process comprise memory operations directed to respective pages in each of the non-volatile memory devices.

2. The method of claim 1, wherein the plurality of non-volatile memory devices comprises a plurality of memory dies, each non-volatile memory device comprising a distinct memory die of the plurality of memory dies.

3. The method of claim 1, wherein:
   the plurality of non-volatile memory devices comprises a first memory device and remaining memory devices;
   the respective pages of the remaining memory devices store data; and
   the respective page of the first memory device stores parity information corresponding to the data stored in the respective pages of the remaining memory devices.

4. The method of claim 1, wherein the determining comprises determining that the first memory operation is an only remaining incomplete memory operation for its process.

5. The method of claim 1, wherein assigning preference values comprises, for a respective non-volatile memory device:
   determining that all memory operations that the respective non-volatile memory device currently can perform are of a first type selected from the group consisting of host writes, garbage collection writes, and garbage collection reads; and
   in response to the determining, assigning preference values to the memory operations that indicate a preference of the respective non-volatile memory device for the first type of memory operation over other types of memory operations.

6. The method of claim 1, wherein:
   the storage controller comprises a front-end controller and a plurality of back-end controllers coupled to the front-end controller;
   each back-end controller is coupled to a respective subset of the plurality of non-volatile memory devices;
   the front-end controller receives host write requests and schedules garbage collection writes in accordance with the host write requests;
   the back-end controllers schedule garbage collection reads, wherein each garbage collection read corresponds to a respective garbage collection write; and
   the front-end controller performs the identifying, the assigning of preference values, and the assigning of each memory operation.

7. The method of claim 1, further comprising, for each memory operation of the plurality of memory operations, assigning preference values to each of the non-volatile memory devices, wherein assigning each memory operation to a distinct non-volatile memory device is performed using both the preference values assigned to each of the non-volatile memory devices for each memory operation and the preference values assigned to each of the memory operations for each non-volatile memory device.

8. The method of claim 7, wherein:
the storage controller comprises a front-end controller and a plurality of back-end controllers coupled to the front-end controller;
each back-end controller is coupled to a respective subset of the plurality of non-volatile memory devices; and
assigning the preference values to each of the non-volatile memory devices comprises, for a respective memory operation of the plurality of memory operations, assigning preference values that indicate a preference of the respective memory operation for a first subset of the plurality of non-volatile memory devices over other subsets of the plurality of non-volatile memory devices.

9. The method of claim 1, wherein:
assigning preference values to each of the memory operations comprises, for each non-volatile memory device, ranking the memory operations in order of preference; and
assigning each memory operation to a distinct non-volatile memory device comprises solving The Stable Marriage Problem in accordance with the ranking of the memory operations in order of preference for each non-volatile memory device;
wherein:
solving The Stable Marriage Problem comprises:
ranking each member of a first group of N non-volatile memory devices in order of preference for each member of a second group of N memory operations, where N is an integer greater than one;
ranking each member of the second group of N memory operations in order of preference for each member of the first group of N non-volatile memory devices; and
for the first and second groups: assigning each member of each group to a distinct member of the other group, such that there are no two members of different groups who have a higher preference for each other than with their assigned partners.

10. The method of claim 9, further comprising partitioning the memory operations into a group of host writes, a group of garbage collection writes, and a group of garbage collection reads;
wherein ranking the memory operations in order of preference comprises ranking the groups and ordering the memory operations by the ranked groups.

11. The method of claim 1, wherein:
assigning preference values to each of the memory operations comprises, for each non-volatile memory device, assigning weights to the memory operations; and
assigning each memory operation to a distinct non-volatile memory device comprises solving The Assignment Problem in accordance with the weights of the memory operations for each non-volatile memory device
wherein:
solving The Assignment Problem comprises:
ranking each member of a first group of N non-volatile memory devices in order of preference for each member of a second group of N memory operations, where N is an integer greater than one;

weighting each member of the second group of N memory operations in accordance with a cost that varies as a function of assignments; and
for the first and second groups: assigning each member of each group to a distinct member of the other group, such that a total cost is minimized.

12. The method of claim 11, further comprising partitioning the memory operations into a group of host writes, a group of garbage collection writes, and a group of garbage collection reads;
wherein assigning weights to the memory operations comprises, for each non-volatile memory device, assigning a first weight to each operation in the group of host writes, assigning a second weight to each operation in the group of garbage collection writes, and assigning a third weight to each operation in the group of garbage collection reads, wherein the first, second, and third weights are distinct.

13. The method of claim 1, wherein identifying the number of memory operations to be performed by the non-volatile memory devices comprises:
determining a ratio of host writes to garbage collection writes, based on a write amplification of the storage system;
selecting host writes and garbage collection writes such that a number of host writes and a number of garbage collection writes satisfy the ratio; and
selecting garbage collection reads such that a number of garbage collection reads equals the number of garbage collection writes.

14. A storage system, comprising:
a plurality of non-volatile memory devices;
one or more processors; and
memory storing one or more programs configured for execution by the one or more processors, the one or more programs comprising instructions that when executed by the one or more processors, cause the storage system to:
identify a plurality of memory operations to be performed by a plurality of the non-volatile memory devices in the storage system, wherein
the plurality of memory operations comprises a first number of memory operations and the plurality of non-volatile memory devices comprises a second number of memory devices,
the first number is no greater than the second number,
each memory operation of the plurality of memory operations is to be performed by a distinct non-volatile memory device, and
the memory operations comprise host writes, garbage collection writes, and garbage collection reads;
for each non-volatile memory device in the plurality of non-volatile memory devices, assign preference values to each of the memory operations in the plurality of memory operations, wherein to assign preference values the one or more programs further comprise instructions to cause the storage system to, for a respective non-volatile memory device:
determine that a first memory operation of the plurality of memory operations is associated with a process for which no more than a specified number of memory operations are incomplete; and
in response to determining that the first memory operation of the plurality of memory operations is associated with the process, assign preference values to the plurality of memory operations that indicate a preference of the respective non-volatile memory device for the first memory operation over other memory operations of the plurality of memory operations; and assign each memory operation in the plurality of memory operations to a distinct non-volatile memory device in the plurality of non-volatile memory devices, using the preference values assigned to each of the memory operations for each non-volatile memory device;

wherein:

the storage system assigns each memory operation to a distinct non-volatile memory device by:
   solving a first predefined combinatorial optimization problem known as The Stable Marriage Problem using the Gale-Shapely iterative algorithm; or
   solving a second predefined combinatorial optimization problem known as The Assignment Problem using the Hungarian algorithm;
and wherein:
   the one or more processors manage a plurality of processes;
   each memory operation is part of a process;
   a respective process comprises memory operations of a common type selected from the group consisting of host writes, garbage collection writes, and garbage collection reads; and
   the memory operations of a respective process comprise memory operations directed to respective pages in each of the non-volatile memory devices.

15. The storage system of claim 14, wherein the plurality of non-volatile memory devices comprises a plurality of memory dies, each non-volatile memory device comprising a distinct memory die of the plurality of memory dies.

16. A non-transitory computer-readable storage medium storing one or more programs configured for execution by one or more processors of a storage system that further comprises a plurality of non-volatile memory devices, the one or more programs comprising instructions that when executed by the one or more processors, cause the storage system to:

identify a plurality of memory operations to be performed by a plurality of the non-volatile memory devices in the storage system, wherein
   the plurality of memory operations comprises a first number of memory operations and the plurality of non-volatile memory devices comprises a second number of memory devices,
   the first number is no greater than the second number,
   each memory operation of the plurality of memory operations is to be performed by a distinct non-volatile memory device, and
   the memory operations comprise host writes, garbage collection writes, and garbage collection reads;

for each non-volatile memory device in the plurality of non-volatile memory devices, assign preference values to each of the memory operations in the plurality of memory operations, wherein to assign preference values the one or more programs further comprise instructions to cause the storage system to, for a respective non-volatile memory device:
   determine that a first memory operation of the plurality of memory operations is associated with a process for which no more than a specified number of memory operations are incomplete; and
   in response to determining that the first memory operation of the plurality of memory operations is associated with the process, assign preference values to the plurality of memory operations that indicate a preference of the respective non-volatile memory device for the first memory operation over other memory operations of the plurality of memory operations; and assign each memory operation in the plurality of memory operations to a distinct non-volatile memory device in the plurality of non-volatile memory devices, using the preference values assigned to each of the memory operations for each non-volatile memory device;

wherein:

the storage system assigns each memory operation to a distinct non-volatile memory device by:
   solving a first predefined combinatorial optimization problem known as The Stable Marriage Problem using the Gale-Shapely iterative algorithm; or
   solving a second predefined combinatorial optimization problem known as The Assignment Problem using the Hungarian algorithm; and wherein:
the one or more processors manage a plurality of processes;
each memory operation is part of a process;
a respective process comprises memory operations of a common type selected from the group consisting of host writes, garbage collection writes, and garbage collection reads; and
the memory operations of a respective process comprise memory operations directed to respective pages in each of the non-volatile memory devices.

17. The storage system of claim 14, wherein:
assigning preference values to each of the memory operations comprises, for each non-volatile memory device, ranking the memory operations in order of preference; and
assigning each memory operation to a distinct non-volatile memory device comprises solving The Stable Marriage Problem in accordance with the ranking of the memory operations in order of preference for each non-volatile memory device;

wherein:
solving The Stable Marriage Problem comprises:
   ranking each member of a first group of N non-volatile memory devices in order of preference for each member of a second group of N memory operations, where N is an integer greater than one;
   ranking each member of the second group of N memory operations in order of preference for each member of the first group of N non-volatile memory devices; and
   for the first and second groups: assigning each member of each group to a distinct member of the other group, such that there are no two members of different groups who have a higher preference for each other than with their assigned partners.

18. The storage system of claim 14, wherein:
assigning preference values to each of the memory operations comprises, for each non-volatile memory device, assigning weights to the memory operations; and
assigning each memory operation to a distinct non-volatile memory device comprises solving The Assignment Problem in accordance with the weights of the memory operations for each non-volatile memory device;

wherein:

solving The Assignment Problem comprises:

ranking each member of a first group of N non-volatile memory devices in order of preference for each member of a second group of N memory operations, where N is an integer greater than one;

weighting each member of the second group of N memory operations in accordance with a cost that varies as a function of assignments; and for the first and second groups: assigning each member of each group to a distinct member of the other group, such that a total cost is minimized.

19. The non-transitory computer-readable storage medium of claim 16, wherein:

assigning preference values to each of the memory operations comprises, for each non-volatile memory device, ranking the memory operations in order of preference; and assigning each memory operation to a distinct non-volatile memory device comprises solving The Stable Marriage Problem in accordance with the ranking of the memory operations in order of preference for each non-volatile memory device;

wherein:

solving The Stable Marriage Problem comprises:

ranking each member of a first group of N non-volatile memory devices in order of preference for each member of a second group of N memory operations, where N is an integer greater than one;

ranking each member of the second group of N memory operations in order of preference for each member of the first group of N non-volatile memory devices; and for the first and second groups: assigning each member of each group to a distinct member of the other group, such that there are no two members of different groups who have a higher preference for each other than with their assigned partners.

20. The non-transitory computer-readable storage medium of claim 16, wherein:

assigning preference values to each of the memory operations comprises, for each non-volatile memory device, assigning weights to the memory operations; and assigning each memory operation to a distinct non-volatile memory device comprises solving The Assignment Problem in accordance with the weights of the memory operations for each non-volatile memory device;

wherein:

solving The Assignment Problem comprises:

ranking each member of a first group of N non-volatile memory devices in order of preference for each member of a second group of N memory operations, where N is an integer greater than one;

weighting each member of the second group of N memory operations in accordance with a cost that varies as a function of assignments; and for the first and second groups: assigning each member of each group to a distinct member of the other group, such that a total cost is minimized.

* * * * *